(12) United States Patent
Farchmin et al.

(10) Patent No.: US 7,116,993 B2
(45) Date of Patent: Oct. 3, 2006

(54) SYSTEM AND METHOD FOR PROVIDING LOCATION BASED INFORMATION

(75) Inventors: David W. Farchmin, Grafton, WI (US); David D. Brandt, Milwaukee, WI (US); Ramdas M. Pai, Racine, WI (US); Fahed Awad, Cudahy, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 284 days.

(21) Appl. No.: 10/259,089

(22) Filed: Sep. 27, 2002

(65) Prior Publication Data

US 2004/0203930 A1    Oct. 14, 2004

(51) Int. Cl.
*H04B 5/00*    (2006.01)

(52) U.S. Cl. .................................................. 455/457
(58) Field of Classification Search ................ 455/457, 455/456.1, 422.1, 403, 41.1, 525
See application file for complete search history.

(56) References Cited

U.S. PATENT DOCUMENTS

| | | | |
|---|---|---|---|
| 4,598,275 A | 7/1986 | Ross et al. | |
| 4,612,620 A | 9/1986 | Davis et al. | |
| 4,803,039 A | 2/1989 | Impink, Jr. et al. | |
| 5,287,266 A | 2/1994 | Malec et al. | |
| 5,544,321 A | 8/1996 | Theimer et al. | |
| 5,598,572 A | 1/1997 | Tanikoshi et al. | |
| 5,627,549 A | 5/1997 | Park | |
| 5,649,300 A | 7/1997 | Snyder et al. | |
| 5,751,221 A | 5/1998 | Stanfield et al. | |
| 5,835,061 A | 11/1998 | Stewart | |
| 5,956,465 A | 9/1999 | Takagi et al. | |
| 5,960,085 A | 9/1999 | de la Huerga | |
| 5,960,341 A | 9/1999 | LeBlanc et al. | |
| 6,011,487 A | 1/2000 | Plocher | |
| 6,060,993 A | 5/2000 | Cohen | |
| 6,211,799 B1 | 4/2001 | Post et al. | |
| 6,236,335 B1 | 5/2001 | Goodwin, III | |
| 6,282,455 B1 | 8/2001 | Engdahl | |
| 6,321,092 B1 | 11/2001 | Fitch et al. | |
| 6,359,711 B1 | 3/2002 | Cole et al. | |
| 6,362,783 B1 | 3/2002 | Sugiura et al. | |
| 6,446,004 B1 | 9/2002 | Cao et al. | |
| 6,496,775 B1 | 12/2002 | McDonald, Jr. et al. | |
| 6,611,755 B1 | 8/2003 | Coffee et al. | |

(Continued)

FOREIGN PATENT DOCUMENTS

DE    38 32 375 A1    3/1990

(Continued)

OTHER PUBLICATIONS

A Statistical Modeling Approach to Location Estimation; IEEE Transactions on Mobile Computing; vol. 1, No. 1, Jan.-Mar. 2002; p. 59-69; Roos, et al.

(Continued)

*Primary Examiner*—William D. Cumming
(74) *Attorney, Agent, or Firm*—Quarles & Brady, LLP; Alexander M. Gerasimow

(57) ABSTRACT

A method and system for providing information corresponding to one of several machines to a wireless interface device (WID) where the machines are located within a facility and at least a sub-set of the machines are located within a facility space where the invention includes specifying machine zones within the facility including a separate zone adjacent each machine within the space, identifying the location of the WID within the facility and determining if the WID is located within the machine zone, where the WID is located within the machine zone, identifying machine information related to an associated machine and transmitting the information to the WID.

56 Claims, 13 Drawing Sheets

U.S. PATENT DOCUMENTS

| | | |
|---|---|---|
| 2001/0024174 A1 | 9/2001 | Turner |
| 2002/0101375 A1 | 8/2002 | Stilp et al. |
| 2002/0123325 A1 | 9/2002 | Cooper |
| 2002/0125886 A1 | 9/2002 | Bates et al. |
| 2003/0011467 A1 | 1/2003 | Suomela |
| 2003/0146835 A1 | 8/2003 | Carter |
| 2004/0203930 A1 | 10/2004 | Farchmin et al. |
| 2004/0260518 A1 | 12/2004 | Polz et al. |

FOREIGN PATENT DOCUMENTS

| | | |
|---|---|---|
| DE | 101 42 279 | 3/2003 |
| EP | 0 992 921 A2 | 4/2000 |
| GB | 2 365 662 | 2/2002 |
| WO | WO 96/23340 | 1/1996 |
| WO | WO 00/17737 | 3/2000 |
| WO | WO 00/50919 | 8/2000 |
| WO | WO 01/16607 A2 | 3/2001 |
| WO | WO 01/82032 A2 | 11/2001 |
| WO | WO 02/12992 A2 | 2/2002 |
| WO | WO 02/43428 A1 | 5/2002 |
| WO | WO 02/054813 A1 | 7/2002 |
| WO | WO 02/056274 A1 | 7/2002 |

OTHER PUBLICATIONS

A Statistical Modeling Approach To Location Estimation; Master's Thesis, Univ. of Helsinki, Department of Computer Science, May 5, 2001, Teemu Tonteri.

Authorization/Preferences Specification

| WID # | Machine # | Access Authority | Access Spec. | Control Authority | Control Spec. |
|---|---|---|---|---|---|
| 1 | M1 | Y-1 | Spec-1 | Y-4 | Spec-1 |
|   | M2 | Y-1 | Spec-3 | N | "LOA" |
|   | M3 | N | "LOA" | N | "LOA" |
|   | M4 | Y-2 | Spec-3 | Y-2 | Spec-3 |
|   | M5 | Y-2 | Spec-2 | N | "LOA" |
|   | M6 | N | "LOA" | N | "LOA" |
|   | M7 | Y-1 | Spec-4 | Y-5 | Spec-2 |
|   | M8 | Y-5 | Spec-1 | Y-4 | Spec-4 |
|   | ... | | | | |
|   | MNNN | Y-2 | Spec-5 | N | Spec-2 |
| 2 | M1 | Y-8 | Spec-1 | Y-1 | Spec-1 |
|   | M2 | Y-1 | Spec-2 | N | Spec-1 |
|   | M3 | N | "LOA" | N | "LOA" |
|   | M4 | N | "LOA" | N | "LOA" |
|   | M5 | N | "LOA" | N | "LOA" |
|   | M6 | N | "LOA" | N | "LOA" |
|   | M7 | Y-1 | Spec-3 | Y-5 | Spec-2 |
|   | M8 | Y-5 | Spec-4 | Y-4 | Spec-4 |
|   | ... | | | | |
|   | MNNN | N | "LOA | N | "LOA" |
| 3 | M1 | Y-1 | Spec-3 | Y-4 | Spec-1 |
|   | M2 | Y-1 | Spec-1 | N | Spec-1 |
| ... | | | | | |
| XX... | | | | | |

Fig. 3

Current Machine Control Table

| Machine# | Current Controlling WID# | Queued WIDs |
|---|---|---|
| M4 | 6 | 2,3 |
| M29 | 12 | NA |
| M33 | 1 | 4,19 |

...

SYSTEM AND METHOD FOR PROVIDING LOCATION BASED INFORMATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The field of the invention is wireless information devices and more specifically wireless devices for automatically obtaining location based information related to machines when a wireless device is placed within proximity of the machines.

There are many industries where electronic interfaces have been developed to facilitate monitoring or control or both system monitoring and control. For instance, in the industrial automation industry, a manufacturing plant may include several thousand different machines arranged to form a plurality of machine lines that cooperate to produce products. In this case, each machine or a sub-set of machines may be equipped with an interface including a processor, some type of information output device and some type of information input device. The output device is often a display screen for displaying text, graphics, etc., and the input device is typically a keyboard.

Because of the nature of industrial automation, some industrial facilities have adopted policies requiring local or location specific control and associated interfacing. In industrial control, many (e.g., tens or perhaps even hundreds) machines may be positioned along a machine line so that improper performance of, or damage to, one machine affects operation of a large number of related downstream machines. In addition, improper machine operation, given unforeseen circumstances, may result in injury to facility employees proximate the malfunctioning machine or proximate downstream machines. In these cases, if remote control were allowed, an operator may alter operation of one machine believing that some other similar machine is being adjusted with unintended and potentially costly results.

In an effort to avoid unintended results, many automated facilities require operators to be located adjacent or proximate a machine prior to altering machine operation. This proximity requirement is enforced by providing machine monitoring and controlling interfaces proximate associated machines. More specifically, the interfaces are typically placed in positions that enable an interface operator to observe machine operation prior to, during and after adjustment of machine operating characteristics. Here, the interfacing is local despite remote or centralized processing. In this manner, an operator can essentially simultaneously observe operation of a particular machine and the information provided by an interface associated with the particular machine. This "dual viewing" capability facilitates a far more comprehensive understanding of machine conditions and enables the operator to quickly determine if control alterations have desired effects.

Requiring even basic interfaces at each machine or adjacent logically related sub-sets of machines is relatively expensive as each interface typically requires a display of some type and at least a set of control buttons or a keyboard of some type. To minimize costs many control systems are designed to provide multiplexed control where one interface may be provided for several proximate machines. For instance, one interface may be provided for ten proximate machines.

Multi-machine interfaces represent a tradeoff between cost and functionality. To this end, as indicated above, unfortunately, the "dual viewing" (i.e., simultaneous view of a machine and an associated interface) capability afforded by providing interfaces as close as possible to associated machines is hampered when the number of interfaces is less than the number of machines within a facility. Thus, in the case above, where a single interface is provided for ten separate but proximate machines, the interface may not be located in an optimal position for observing operation of a sub-set of the ten machines while simultaneously viewing the interface.

In addition, where a single interface is provided for more than one machine, the interface has to be relatively more complex than an interface provided for a single machine. To this end, to avoid confusion and unintended changes to machine operation, it is generally accepted that an interface should only display information corresponding to a single machine or a related subset of machines at any given time. For example, where a single interface is provided for accessing information corresponding to and controlling ten logically related machines, if the interface were programmed to provide information and controls for two or more of the machines at one time, an interface operator may examine data corresponding to one of the ten machines believing that the examined data corresponds to another of the ten machines or worse, the operator may adjust control of one of the ten machines believing that the operator is controlling another of the ten machines.

To avoid this type of confusion and related control errors, multi-machine interfaces are typically programmed so that information and control tools corresponding to only a single one of the machines associated with an interface are provided at any time. Thus, multi-machine interfaces generally require some type of machine selection process and corresponding tools that allow a user to select which of several machines the user wishes to interrogate and/or control and hence are more complex than single machine interfaces that can automatically provide information to an operator.

Furthermore, in the case of multi-machine interfaces there is always the possibility that an operator may inadvertently select one machine believing that the operator has selected another machine for monitoring or control. Here, as above, the possibility for an unintended and costly result is great.

As in most businesses, in an automated facility, there are many different types of employees and machine access and control requirements for the employee types are very different. For instance, a janitor likely has no need to access machine information or control machine operation, a maintenance engineer will require access to certain machine information and control capabilities and a process engineer may require access to a completely different set of machine information and control capabilities. Systems have existed for a long time that can restrict information access and control to specific authorized personnel (e.g., password protection, biometric comparison, etc.). Unfortunately, these systems generally require relatively complex and expensive interface devices (e.g., a complete keyboard or some type of biometric scanner). As indicated above, in automation, most interfaces are minimized to reduce costs and hence the added security that comes with restricting access and control to those having a need to access and control are often foregone.

One solution to the above problems that has been used in the automation industry is to provide hand held devices (HHDs) to machine operators having a need to monitor and/or control facility machines. (Unless indicated otherwise all portable information devices hereinafter will be referred to as HHDs, including PDAs, laptops, etc.). Here, an HHD, as its label implies, is a relatively small and portable device that can be carried around a facility by a machine operator. The HHD is typically provided with a small display screen, a set of buttons or a full keyboard to enable information interchange, a processor, a memory and a communication cable having a distal end configured to be received by a machine port. Each facility machine is provided with a machine port for receiving the HHD cable. To link to a local machine processor, the HHD cable is plugged into the machine port and establishes a one-to-one match where there is no ambiguity.

Here, information access and control can be restricted by restricting access to the HHDs. Thus, for instance, when a maintenance engineer enters a facility to perform maintenance duties, the engineer may check out an HHD from a central HHD location for use in the facility. After the maintenance engineer has completed his duties, the engineer may be required to check the HHD back into the central HHD location. To restrict access and control differently for different personnel there may be classes of HHDs where each class allows a user a unique set of access and control privileges (i.e., a maintenance HHD may have a first set of capabilities while a process control HHD may have a second set of capabilities). Unfortunately the HHD solution described above also has several shortcomings. First, the manual process of linking an HHD to a machine processor is time consuming, burdensome and costly. Again, while one or a small number of linking processes may not seem burdensome, where the process has to be repeated several hundred times during an operator's shift, the combined linking tasks become excessive. In addition, there may be a safety risk in this case and the connection plug may not always be accessible.

Second, where several hundred links may have to be made during a given day, the wear and tear on machine communication ports and HHD cable can be excessive and require either routine replacement or an extremely robust and expensive mechanical linking system.

Third, despite support for some customization regarding the types of information and control provided to a facility employee by way of configuring HHDs as a function of the type of employee that will use the HHD, there is no easy way to allow an employee to customize the appearance of information and control tools provided by the HHD. For instance, one maintenance engineer may want a first set of information presented in a first format while another maintenance engineer may want the same first set of information presented in a second format completely different than the first format.

Fourth, any system that requires an HHD to be tethered to a machine in order to obtain information related to the machine or to control the machine restricts operator movement and may not allow an operator to move into particularly advantageous positions to observe machine operations. Also, in this regard, a mechanical tether is cumbersome to manipulate and therefore is bothersome.

Industries outside industrial automation have faced problems similar to those faced in industrial automation and have devised some solutions that are suitable to the respective industries. For instance, in the medical industry, it has been recognized that the ability to obtain information about a patient automatically upon entering the patients room is advantageous. In a medical facility, a process that requires a physician to manipulate a patient's arm to identify a patient ID on a wristband or the like and then enter the patient ID into an information device to obtain the patient's medical history is burdensome. The process may disturb a sleeping patient, requires that the physician come in close proximity to the patient, is subject to human error and is time consuming. The process is particularly burdensome in emergency situations where time may be of the essence.

European patent application No. 0,992,921 (hereinafter "the '921 reference") entitled "Computer Access Dependent On Location of Access Terminal" which was filed on Sep. 21, 1999 teaches a facility system wherein a separate wireless access point is positioned within each facility room for communicating with physician specific wireless HHDs located within the room. The '921 reference teaches that a physician identifier is stored in the HHD and, when an HHD is sensed within a room, the access point automatically obtains the physician identifier from the HHD, determines a degree of access (i.e., authorization) associated with the physician identifier, accesses information associated with the room (i.e., information associated with a patient within the room) and then transmits a sub-set of the patient information consistent with the physician's degree of access to the HHD for display.

The '921 solution works well in a facility that can easily be divided into cells separated by walls (i.e., patient rooms) and where there is only one set of information (i.e., information related to a single patient) associated with a particular cell. However, if a plurality of patients are located within a single room the '921 reference system cannot determine for which of the plurality of patients a physician seeks information. It is unclear how the '921 reference would resolve the quandary regarding which patient information to provide to a physician when more than one patient resides in a room. The '921 reference presents a problem where a physician may end up reviewing information corresponding to one patient while examining a different patient in the same room—clearly an unacceptable situation. In the context of an automated facility the '921 reference could not be used to select information corresponding to one machine out of a plurality of machines in a room for delivery to an HHD. In addition, in this regard, in many automated environments, several hundred or even thousand monitorable/controllable machines may be located in a single room or space and many of the machines may have similar descriptions so that, for instance, identifying one drill press from within a room including 100 drill presses would be a potentially confusing task.

In addition, the '921 reference fails to teach or suggest any type of location specific equipment control. Failure to discuss equipment control is not surprising given the relatively course location resolution contemplated by the '921 reference.

Moreover, the '921 reference system and other systems of the same ilk require a relatively large number of access points to provide even the relatively coarse location resolution capabilities contemplated. System cost increases along with component count and therefore systems like the '921 reference system are relatively expensive.

In the office automation industry, U.S. Pat. No. 6,359,711 (hereinafter "the '771 patent") which issued on Mar. 19, 2002 and is entitled "System and Method for Supporting A Worker In A Distributed Work Environment" teaches a system where, like the '921 reference, a single access point is located within each room in a facility. The '771 patent teaches that HHDs (i.e., laptop computers) used by specific users are provided with user identifiers. A system database correlates user identifiers with information related to applications that the specific users subscribe to or have authorization to use. In addition, the database also includes information related to office equipment located throughout a facility where the equipment is associated with specific applications. For instance, a word processor application may require access to a printer, a window treatment control application may require access to motorized blinds and an HVAC application may require access to a thermostat control.

The '771 patent teaches that a separate access point is provided in each room. When an HHD is brought into a room, the access point in the room senses the HHD, obtains the user identifier therefrom, accesses the database to identify applications associated with the user identifier, identifies which office equipment types the identified applications must access, locates the single instance of each identified office equipment type that is closest to the access point and then creates a control link between the laptop and the identified equipment instances.

While suitable for an office environment, the '771 patent control scheme is not suitable for an industrial automation environment for several reasons. First, the '771 patent system, like the '921 reference system, relies on clearly delineated and identifiable facility cells (i.e., rooms) and a single access point in each cell. Like the '921 reference, the '921 patent system cannot determine relative proximity between the HHD and a plurality of machines located within a single room. For instance, where an HVAC control, a printer and a laptop are located in the same room, the '771 patent cannot determine if the laptop is closest to the HVAC control or the printer.

Second, the '771 patent system teaches linking a laptop to the closest instance of each required equipment type independent of whether or not the instance is proximate the HHD. For instance, in the case of a word processor application requiring a printer, the '771 patent system locates a closest printer to an access point and enables control of the located printer irrespective of the distance between the printer and the laptop (i.e., the access point). Here, the printer may be five rooms away from the HHD and hence from the person operating the printer. This type of "blind" control is acceptable in the case of a printer application where the end result of an imperfect printing process has a minimal associated cost. However, in the case of automated control of machinery, as indicated above, such blind control often cannot be tolerated.

Third, a system like the '771 patent system would cause confusion in an industrial control environment. To this end, while a particular user may have clearance to observe machine information corresponding to several different machine types and to control various machine types using various applications, simultaneously and automatically presenting information or controls corresponding to two or more machine types at a time would be confusing where only a single machine type can be controlled at any one time.

World patent application No. WO 00/50919, (hereinafter "the '919 reference") Which is titled "Method and Computer Readable Medium for Locating and Tracking a User in a Wireless Network Using a Table of Digital Data" teaches one system that can be used to relatively accurately determine location within a specific space or within a room. To this end, the '919 reference teaches that a plurality of base stations or access points can be installed at locations within a facility. The access points each transmit signals of known strength to mobile HHDs within the facility. The strengths of the signals decrease as a function of distance traveled by a signal. The HHDs each receive the transmitted signals and, based on signal strengths of several of the received signals, determine the location of the HHDs within the facility.

While the '919 reference system advantageously reduces the cost of a location tracking system by reducing the number of required access points within a facility, it is believed that the location resolution and reliability attainable via the '919 reference system will not be sufficient for industrial automation purposes where several different machines may be very close to each other on a facility floor.

World patent application No. WO 02/054813 (hereinafter "the '813 reference") titled "Location Estimation in Wireless Telecommunication Networks" teaches a location system similar to the system described in the '919 reference that relies on signal strength to determine location of a portable device within a facility. The '813 patent, however, applies a statistical model to the received signals to, supposedly, yield a far more accurate device location. Neither of the '919 reference nor the '813 reference contemplates providing machine information or control capabilities based on HHD location.

Thus, it would be advantageous to have a system that could automatically provide machine specific information to an HHD when the HHD is located proximate the machine where the machine is one of a plurality of different machines located in a single room. Automatic information customization for HHD operators would also be advantageous.

BRIEF SUMMARY OF THE INVENTION

In has been recognized that location resolution can be increased beyond room specific granularity and that therefore separate zones within a single room can be identified and associated with specific machines. After machine zones have been identified, wireless information device (WID) location is monitored within a facility. When a WID is located within a machine zone, information (e.g., operating data and/or control specifications) corresponding to the machine is accessed and transmitted to the WID for presentation to a WID operator.

Thus, one object of the invention is to provide a relatively inexpensive automated facility interfacing system. To this end, instead of providing separate interfaces for each facility machine or separate interfaces for sub-sets of machines, a small number of WIDs can be provided to facility operators where each of the WIDs is capable of being rapidly and/or automatically reconfigured to provide machine operating characteristics and control tools. Where suitable, cost can be minimized by employing existing wireless communication systems. For instance, many facilities have been equipped with wireless radio frequency (RF) local area networks (LANs). Signal strengths from these systems decrease with distance from transmitters. Thus, existing LAN access points can be used to provide WID locating signals.

Another object is to minimize the process that must be performed by a WID operator to obtain information from facility machines. In this regard, in at least one embodiment of the invention, when a WID is brought into a machine zone, the information corresponding to the machine in the zone is automatically provided to the WID for presentation. Thus, in this embodiment, there is no need for the user to indicate that information is required and, simply upon walking up to a machine, the user gains access to the machine information.

One other object of the invention is to reduce the possibility of confusing a WID operator with respect to which machine information the operator is observing. Here, the machine zones are limited to being proximate corresponding machines so that the operator has essentially simultaneous capability to view both the WID and a machine corresponding to the information displayed on the WID.

In some embodiments of the invention the WID stores a WID identifier which can be used to identify a sub-set of information to be transmitted to the WID for display. The WID identifier may be associated with a particular facility employee type or a particular employee. For instance, a maintenance engineer may be granted access to one sub-set of machine information while a process engineer is granted access to a second information sub-set.

Thus, another object of the invention is to automatically enforce access and control rules within an industrial facility by interrogating a WID identifier associated with a particular WID user and provide information required by the particular user.

One aspect of the invention defines two (or more) machine zones for at least a sub-set of facility machines and provides different machine information sub-sets to the WID in each of the zones. For instance, in a first relatively large information access zone the system may provide only machine operating characteristics and may limit ability to control a machine associated with the zone by not providing a control specification (i.e., not configuring the WID to receive control commands). In a relatively smaller control zone the system may provide both operating characteristics and some type of control specification that causes the WID to configure to provide control input tools (e.g., touch screen buttons, screen selectable icons, etc.). In these instances, the object is to ensure that machine control only occurs when a WID user is in a position that enables the WID user to observe the affects of changes made to machine operation. For instance, the control zone associated with a first machine may include a five foot space to all sides of the machine while the control zone associated with a second machine may include a small space to one side of the machine from which important operating characteristics are most easily observed.

According to another aspect of the invention, a control zone may be separated from an associated machine to ensure that a WID operator is outside a machine operating space when controlling the machine. For instance, a control zone may be separated from an associated machine by five feet.

Yet another aspect of the invention includes providing guidance messages that help a WID user determine location relative to control and access zones. For instance, in at least some embodiments the only physical landmarks that may be useable to identify zone location will be the machines associated with the zones. As indicated above, the zone shapes and sizes will sometimes be machine dependent (e.g., a control zone for a first machine may include space to all sides of that machine while a control zone for a second machine may include only a small space adjacent one side of the second machine). Here, without some type of guidance message a WID user adjacent a machine may think he is within a control zone and become confused when no control information is provided via the WID. A simple guidance message such as "You are not within a control zone." Can avoid such confusion and should signal to the WID user to continue to hunt for the control zone if control is desired. Similar guidance messages are contemplated in the case of access zones.

One other aspect of the invention includes providing authorization messages that help a WID user assess ability to access and control specific machines. As in the case of the guidance messages, it is contemplated that, once in a zone, a WID user may become confused if the user erroneously believes that the user should receive information that the user is not authorized to obtain. For instance, a user may not be authorized to obtain control information for a particular machine. In a case where a user lacks authority but is in a zone in which an authorized user could access information, the WID provides a message indicating lack of authority thereby clearing up a potentially confusing situation and helping the WID user to know when to stop hunting for a zone.

Consistent with the above, the invention includes a method for providing information corresponding to one of several different machines to a wireless interface device (WID) where the machines are located within a facility and at least a sub-set of the machines are located within a single room. The method comprises the steps of identifying zones within the facility including a separate machine zone adjacent each of the machines within the single room, identifying the location of the WID within the facility, determining if the WID location is within a machine zone, where the WID is located within a machine zone associated with a specific machine, identifying machine information related to the specific machine, transmitting at least a sub-set of the machine information to the WID and presenting the received information via the WID.

According to one aspect of the invention the method further includes the step of storing a WID identifier in the WID, the step of identifying machine information including identifying the WID identifier and selecting a sub-set of the machine information corresponding to the specific identified WID identifier.

According to one embodiment the WID is a first WID and the method is to be used with a plurality of WIDs and wherein, prior to transmitting to the first WID, the method includes the step of determining if a second WID is currently presenting a sub-set of the specific machine information within the machine zone and, if a second WID is currently presenting machine information, limiting the information transmitted to the first WID. Here the information provided to the first WID may be limited to, for instance, access information where control information is provided to the second WID.

According to another aspect of the invention the method may further include the steps of, after the WID is located within a zone corresponding to a specific machine, monitoring WID location and, if the WID is removed from the zone, altering the information provided via the WID. The altering step may include halting provision of the information, erasing the information from the WID memory, indicating that the WID has been removed from the machine zone or any other suitable process that indicates a change of position with respect to the machine zone.

According to another embodiment of the invention, for at least a sub-set of the machines within the room, the step of identifying machine zones includes identifying first and second machine zones where the first machine zone is smaller than the second machine zone and where first and second different sub-sets of machine information correspond to the first and second machine zones, respectively, the method further including the step of, where the WID is within one of the first and second zones corresponding to a specific machine, identifying which of the first and second zones the WID is in and, wherein the step of identifying machine information related to the specific machine includes the step of identifying the information sub-set corresponding to the identified zone. Here the smaller zone may be a control zone while the larger zone may be an information access zone.

One other embodiment further includes the steps of, after the step of presenting, monitoring WID location and, when the WID is located outside the zone corresponding to the specific machine, halting presentation of the information sub-set.

According to one other aspect, the step of identifying zones may further include identifying facility sub-area zones that correspond to machine sub-sets where each machine sub-set includes a set of proximate machines. Here the method may further include the steps of, after determining the location of the WID, determining if the WID is within one of the sub-area zones and, when the WID is located within a sub-area zone associated with a specific machine sub-set, identifying information corresponding to the specific machine sub-set, transmitting at least a sub-set of the machine sub-set information to the WID and presenting the received information via the WID. Here the sub-area information may include a map of the machine sub-set.

According to yet another aspect the machines within the room may be dividable into machine sub-sets where each machine sub-set includes a set of proximate machines and the step of identifying zones may further include identifying area zones that correspond to a plurality of proximate machine sub-sets. Here, the method may further include the steps of, after determining the location of the WID, determining if the WID is within one of the area zones and, when the WID is located within an area zone associated with a specific plurality of machine sub-sets, identifying information corresponding to the specific plurality of machine sub-sets, transmitting the plurality of machine sub-sets information to the WID and presenting the received information via the WID. Here the area information may include a map that illustrates the general juxtapositions of machine sub-sets.

The invention also includes a system for providing information corresponding to one of several different machines to a facility employee where the machines are located within a facility, at least a sub-set of the machines are located within a single room and where a separate machine zone is adjacent each of the machines within the single room, the system comprising a wireless information device (WID) including a transceiver and a WID processor, a plurality of access points, each access point including a transceiver, a database including machine information corresponding to each of the machines, a controller linked to the access points and the database and including a controller processor and wherein, at least one of the processors is programmed to cooperate with the access points to identify WID location within the facility and determine if a WID is within a machine zone corresponding to a specific machine and, when a WID is within a machine zone, the controller processor identifies machine information corresponding to the specific machine and causes the access points to transmit at least a sub-set of the machine information to the WID for presentation via the WID.

The transmitted information may include a control interface specification for the specific machine and the WID may use the received information to configure control input components for receiving control commands for the specific machine.

In one embodiment the at least one processor, after the machine information is presented, continues to monitor WID location and, if the WID is removed from the zone, the WID processor alters the information presented via the WID. In another embodiment the system further includes at least one updating device that periodically updates the machine information and the controller processor causes the access points to transmit the periodically updated information to the WID for presentation.

According to another aspect, after the machine information is presented, the at least one processor monitors WID location and, when the WID is located outside the zone corresponding to the specific machine, the WID processor limits presentation of the machine information.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 2b is a schematic diagram illustrating various components of the device of FIG. 2a;

FIG. 3 is a schematic diagram illustrating an exemplary authorization/preferences specification according to the present invention;

DETAILED DESCRIPTION OF THE INVENTION

Figure 1:
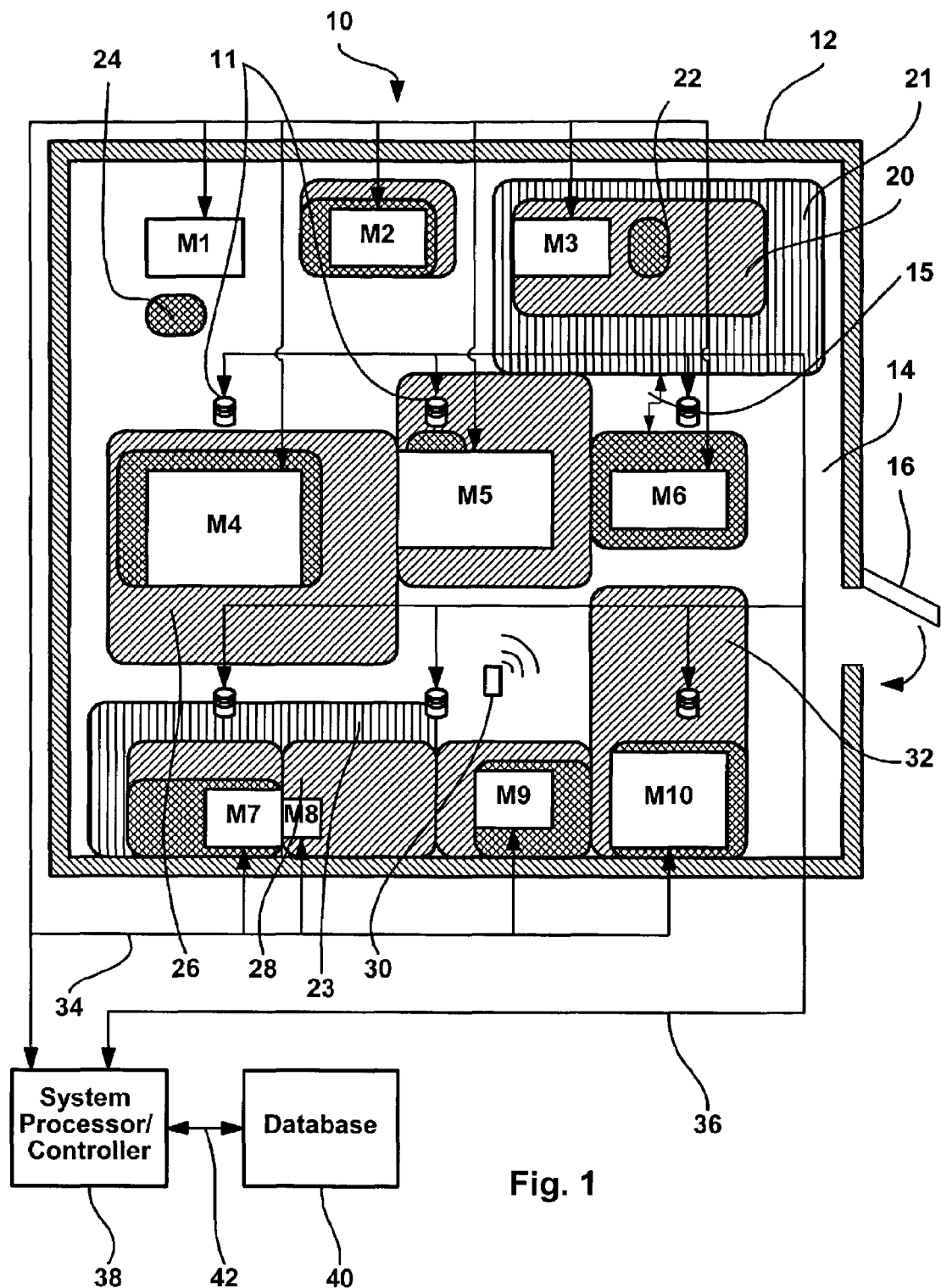
FIG. 1 is a schematic diagram illustrating an exemplary industrial facility and zone aspects according to the present invention.

Referring now to the drawings wherein like reference numbers correspond to similar elements throughout the several views and, more specifically, referring to FIG. 1, the present invention will be described in the context of an exemplary, albeit simplified, manufacturing facility 10 that includes a rectilinear facility floor space or area 14 confined by four facility walls collectively identified by numeral 12. In the exemplary facility 10, the entire area 14 comprises a single room (i.e., there are no wall partitions within facility 10 and all of the facility resides on a single level). A doorway 16 is provided to allow access to area 14.

As illustrated in FIG. 1, exemplary facility 10 includes ten separate machines identified by labels M1 through M10. The exemplary machines M1 through M10 may include any type of manufacturing machine such as a mill, a drill, a transfer line, a laser cutting device, a vision system, any of several different types of robots, clamps, etc. The machines M1 through M10 are shown as being different sizes to visually illustrate that the machines may have very different physical footprints. For example, machine M4 is illustrated as having a much larger physical footprint than machine M8. In general, the machines M1–M10 are spaced out within area 14 although, in some cases, machines may be positioned directly next to each other such as, for instance, machines M7 and M8 in FIG. 1.

In FIG. 1 it is contemplated that each of machines M1–M10 includes at least one and, in many cases, a plurality of sensing devices (not illustrated) that sense machine operating characteristics and provide signals that can be used to facilitate machine monitoring via an interface (i.e., a WID). For instance, in the case of a drilling machine, sensors may include limit switches that are tripped when a drill slide reaches various positions along a travel path, on/off switches, speed sensing switches, motor operating characteristic sensors, etc.

In addition to including sensing devices, it is contemplated that most, if not all, of machines M1–M10 will includes some type of control interface to facilitate control and control adjustment. For example, again, in the case of a drilling machine, drill slide stroke length may be altered, drill speed may be altered, the angle at which a drill bit enters a work piece may be altered, etc.

Referring still to FIG. 1, in addition to the components described above, facility 10 also includes a plurality of communication access points 11, a system processor/controller 38, a database 40, at least one wireless information device (WID) 30 and a plurality of two-way data buses 34, 36 and 42. Controller 38 may be positioned within facility 10 or may be located at some remote location such as, for instance, in a separate building, in a separate room within the facility that includes area 14 or at a completely different location such as a remote campus associated with facility 10. In addition, in many industrial environment, controller 38 will be physically associated with specific machine lines so that the controller 38 may be positioned, for instance, at the front end of a line of machines to facilitate easy access to machine operating characteristics adjacent the machines and/or to allow operating characteristics to be altered in a proximate manner. In FIG. 1, controller 38 is linked to each of machines M1–M10 via a two-way data bus 34 that allows controller 38 to monitor machine operating characteristics as well as control machine operation.

Controller 38 is typically a processor (typically having PLC capabilities) based workstation capable of running various types of computer programs. For instance, some programs are machine control programs that enable controller 38 to either separately control each machine M1–M10 or, safely and precisely sequence machine operation thereby allowing relatively complex manufacturing processes to be performed in an efficient manner. In addition, other controller programs may allow controller 38 to derive various machine operating characteristics from monitored or sensed characteristics (e.g., motor voltage and current data is useful to derive stator and rotor resistance estimates, system inductances, identify harmonics, determine system torques, etc.) and to run complex algorithms to identify operating trends, alarm conditions, potentially unsafe conditions, maintenance requirements, raw material requirements and so on. Moreover, controller 38 also runs programs that facilitate data management and warehousing so that subsequent algorithms may be applied to warehoused data to identify historical operating patterns for various purposes.

Furthermore, controller 38 runs programs designed to support interfacing with facility operators (e.g., maintenance personnel, process engineers, etc.) thereby providing control capabilities and system monitoring capabilities. To this end, controller 38 may include its own input and output interfacing devices such as a display screen, a keyboard, a pointing and selecting device such as a mouse or trackball or any other types of interfacing devices known in the art. Although not illustrated, other interfacing devices may be provided within facility 10 to enable monitoring and control.

Controller 38 is linked via two-way data bus 42 to data base 40. Controller programs are stored in database 40. In addition, data generated by controller 38 is stored in database 40 and can be accessed to allow examination of historical machine operating characteristics, real time operating characteristics and any other data generated by algorithms performed by controller 38.

Referring still to FIG. 1, each information access point 11 includes a two-way wireless transceiver that, as well known in the computer arts, is capable of transmitting and receiving electromagnetic (e.g., radio or infrared) signals within an area proximate the transceiver. Wireless transceivers like access points 11 are well known in the industry and therefore, in the interest of simplifying this explanation, will not be described here in detail. For the purposes of the present invention, it should suffice to say that each transceiver 11 transmits information signals which decrease in strength as distances from the transceiver increase. In the illustrated example, six separate access points 11 are provided within area 14 and are generally equi-spaced within area 14. Typically, access points 11 will be mounted on the ceiling within an area 14 to allow relatively unobstructed communication between an access point 11 and other devices that communicate therewith. While access points 11 are illustrated as being substantially equi-spaced within area 14, it should be appreciated that other access point arrangements are contemplated and that, in many cases, other access point arrangements may be most suitable given specific machine layouts, the physical characteristics of each machine and machine zone layouts (described below).

Controller 38 is linked to each access point 11 via a two-way data bus 36 which allows controller 38 to receive information from the access points 11 and also allows controller 38 to provide information to each of the access points 11 for transmission within area 14. Information received from each access point 11 is typically tagged by the access point so that controller 38 can determine which access point 11 provided the received information. This tagging may either be performed by access point 11 earmarking data packets with an access point identifier (e.g., an access point number) or, in the alternative, may be facilitated by simply providing separate hardwires from each of the access points 11 to the controller 38. In a similar fashion, controller 38 and access points 11 are configured such that controller 38 can address information to each separate and specific access point 11.

Referring still to FIG. 1, WID 30 is generally a wireless handheld device that includes a transceiver like the transceivers that comprise access points 11 so that WID 30 can wirelessly transmit information and can wirelessly receive information via electromagnetic communication or some other suitable wireless communication. Thus, generally, WID 30 is equipped to communicate with any access point 11 in area 14. It should be appreciated that, while the illustrated area 14 is relatively small, many industrial facilities may include much larger spaces such as, for instance, spaces including tens of thousands of square feet. In these cases, it is contemplated that the transmitting distance of a typical WID 30 will be insufficient to transmit information to all access points within a facility. In other words, while WID 30 may be able to communicate with each access point 11 within a facility, communication will be limited by signal strength capabilities and reliable transmissions will require a WID proximate access points.

To facilitate a good understanding of the present invention some phrases should be defined. To this end, unless indicated otherwise, hereinafter the phrase "access information" will be used to refer to machine operating characteristics and other machine data derived therefrom, either real time or historical. The phrase "access specification" will be used to refer to a specification that includes information that can be used by a WID 30 to present access information in a specific way (i.e., an access specification defines screen shots or presentations). Similarly, the phrase "control information" will be used to refer to information necessary to facilitate machine control. For instance, to adjust the stroke of a drill slide a WID operator must first know the current stroke limits—the current stroke settings comprise control information. In addition, the phrase "control specification" is used hereinafter to refer to a specification that includes information useable by a WID to present control information and to configure WID input devices to receive control input commands.

For instance, a control specification may associate certain WID buttons with specific control commands such as increase speed or decrease speed. In these cases the control specification may also include instructions to be displayed to a WID user that explain the button-function association. In the alternative, a control specification may define pull-down menus, control icons, touch screen buttons, etc., to be displayed via a WID screen. Here the control specification would also associate the screen selection tools with specific control functions. The screen and other types of control inputs will generally be referred to hereinafter as control tools.

Referring still to FIG. 1, according to at least one embodiment of the present invention, sub-spaces within area 14 are earmarked or identified as machine zones associated with each of the separate machines M1–M10. For instance, a space identified by numeral 24 includes a relatively small region adjacent machine M1 that is specifically associated with machine M1, space 24 referred to hereinafter as the machine zone associated with machine M1. Other numbered machine zones in FIG. 1 include machine zone 20 associated with machine M3, machine zone 26 associated with machine M4, machine zone 28 associated with machine M8 and machine zone 32 associated with machine M10. Each machine zone corresponds to a small region within area 14 in which it has been deemed suitable for a system operator (e.g., maintenance engineer, machine operator, etc.) to access machine operating characteristics and/or control the machine associated with a particular zone. For instance, when a system operator is within zone 26 it may be suitable for the operator to access operating characteristics corresponding to machine M4. Similarly, it may only be deemed suitable for an operator to control machine M1 when the operator is physically present within small zone 24.

The zone restrictions on access and control are provided and enforced to increase facility safety and reduce operator confusion. For instance, if an operator were within zone 32 corresponding to machine M10 but was receiving access information corresponding to machine M2, the operator would clearly be confused. Similarly, if an operator were located within zone 24 corresponding to machine M1 but was receiving control information corresponding to machine M3, the operator may inadvertently and incorrectly alter operation of machine M3 while intending to alter operation of machine M1.

In FIG. 1 two different types of machine zones are illustrated including control zones and access zones. Double cross-hatched zones like zones 22 and 24 are control zones. Control zones are typically relatively small regions proximate associated machines where, when a system operator is within the control zone, the operator is in a particularly advantageous position with respect to the machine to visually observe important operating characteristics of the machine and to observe the effects on machine operation that are caused by control modification. For example, with respect to machine M1, the best and perhaps the only region in which to observe machine operation sufficiently during control modification is small zone 24 which includes a portion of one side of machine M1. Similarly, small control zone 22 to one side of machine M3 is the only location from which an operator can suitably observe control modifications to machine M3. Other machine control zones are illustrated by the double cross-hatched regions adjacent the machines illustrated in FIG. 1.

It should be appreciated that each type of machine within a facility 10 will have different physical characteristics and therefore suitable control zones will be machine type specific. For instance, while small zone 24 corresponds to machine M1, the control zone corresponding to machine M6 includes space on all sides of machine M6. It should also be appreciated that there may be some machines where the machine simply operates and no control zone is provided. For example, in FIG. 1 machine M8 is not associated with a control zone.

In FIG. 1 single cross-hatched zones including zones 20, 26, 28 and 32 are referred to access zones. As its label implies, an access zone is a region in which it has been deemed suitable for a system operator to access or monitor an associated machine's operating characteristics (i.e., access information). For instance, when an operator is within zone 20 it is suitable for the operator to access operating characteristics of machine M3. Similarly, when an operator is within zone 28 it is suitable for the operator to access operating characteristics of machine M8.

As illustrated, typically, the monitor zone will be larger than the control zone corresponding to a single machine. For instance, access zone 20 is much larger than control zone 22 corresponding to machine M3. Similarly, the access zone corresponding to machine M5 is much larger than the control zone corresponding to machine M5. Access zones are larger than associated control zones because, generally, characteristic access or monitoring is much safer than machine control and an operator may wish to move about a machine while observing real time operating characteristics from various vantage points.

Referring still to FIG. 1, it is contemplated that within a control zone like zone 22, a system operator should be able to access either control information or access information or access both control and access information at the same time. Thus, for instance, within zone 22 an operator can access control and/or access information corresponding to machine M3 while within zone 20 the operator can only access access information corresponding to machine M3. Similarly, within control zone 24 an operator should be able to access each of control and access information corresponding to machine M1. In control zones where both access and control information may be provided, in some cases both types of information will be provided simultaneously if suitable. In other cases it is contemplated that a WID operator may be provided with some type of button, selectable icon, etc., to toggle back and forth between access information and control information.

In addition to access zones and control zones, a third zone type may be associated with at least a sub-set of machines. Here, it is contemplated that, in order to establish an association with a machine and hence obtain machine information, it may be desirable to require that an operator be relatively proximate (e.g., immediately adjacent) the machine but that, after the association has been established, it may be prudent to allow the operator to access machine information at locations relatively less proximate the machine. For instance, to initially associate with a machine and obtain access information an operator may have to be within five feet of the machine and thereafter, to continue to associate with the machine the operator may have to remain in a larger area including all space within fifteen feet of the machine. The larger zone of association described here is generally referred to as a "hysteresis zone".

A single exemplary hysteresis zone is illustrated in FIG. 1 including the vertically hatched area 21 about machine M3. Hysteresis zone 21 is an access hysteresis zone meaning that only access information, not control information, is accessible within zone 21. Control hysteresis zones are also contemplated by the present invention although none are illustrated in FIG. 1.

To minimize operator confusion, in at least one embodiment of the invention, the zones corresponding to adjacent machines do not overlap. For example, the access zones corresponding to adjacent machines M7 and M8 do not overlap. To further minimize the possibility of confusion, buffer zones or regions like region 15 may be provided between machine zones so that zones can be clearly distinguished from each other.

Control zones may be spaced apart from associated machines to ensure that control function are not performed when an operator is in a precarious location with respect to an associated machine. For instance, in FIG. 1, control zone 24 is spaced from, albeit proximate to, associated machine M1 and control zone 22 is spaced from associated machine M3.

In some embodiments of the invention at least some of the hysteresis zones may include portions of machine zones or the entirety of machine zones associated with other machines. For instance, in FIG. 1, the hysteresis zone 23 associated with machine M7 also includes the space surrounding adjacent machine M8. This overlapping feature enables a WID user to travel among related proximate machines so that, for instance, operating characteristics corresponding to a first machine (e.g., M7 in FIG. 1) can be observed while adjacent a second related machine (e.g., M8 in FIG. 1). Here, it is contemplated that in most environments overlapping hysteresis zones would be limited to access information and not control information to ensure that machine control remain localized.

In at least one embodiment of the invention no physical markers are provided within area 14 to distinguish control and access zones and instead the zones are earmarked electronically on a facility map that resembles the schematic of FIG. 1 and that is stored in database 40 for access by controller 38.

Generally, according to the present invention and referring still to FIG. 1, controller 38 controls access and control information provided to WIDs 30 within facility 10 to ensure that machine access and control only takes place within the zones specified by the facility map stored in database 40. To this end, when a WID 30 is located within facility 10 and is turned on, controller 38, access points 11 and WID 30 cooperate to determine WID 30 location within facility 10. Once WID 30 location has been determined, controller 38 accesses the facility map in database 40 and determines if WID 30 is within one of the control or access zones corresponding to a specific machine. If WID 30 is within a machine specific zone, controller 38 accesses access and/or control information corresponding to a specific machine associated with the zone and provides that information to the WID 30 via a proximate access point 11. Thereafter, an operator can either access and monitor machine operation or, if within a control zone, may provide commands to controller 38 via proximate access points 11 to change machine operation.

In addition, in at least some embodiments of the invention, after access or control information has been provided to a WID 30 within a specific zone, if the WID 30 is removed from the zone, the system determines that the WID 30 has been removed from the zone and will limit the access or control information in some fashion. For instance, in one embodiment, when a WID 30 is removed from a control zone (e.g., 22), the control information is simply no longer provided via the WID 30. In addition, in at least one embodiment, when control information is rendered inaccessible via WID 30, a message may be provided to the WID 30 operator indicating that the operator has left the control zone corresponding to the associated machine. In a similar fashion, when a WID 30 is removed from an access zone, some type of informational limitation may take place, such as rendering the access information inaccessible via the WID, indicating that the WID 30 has been removed from the access zone while still providing the access information, etc. In at least one embodiment, access information corresponding to one machine may continue to be provided by a WID 30 until the WID 30 is taken into another machine zone. In other embodiments access information is provided as long as the WID remains within a hysteresis zone.

Figure 2A:
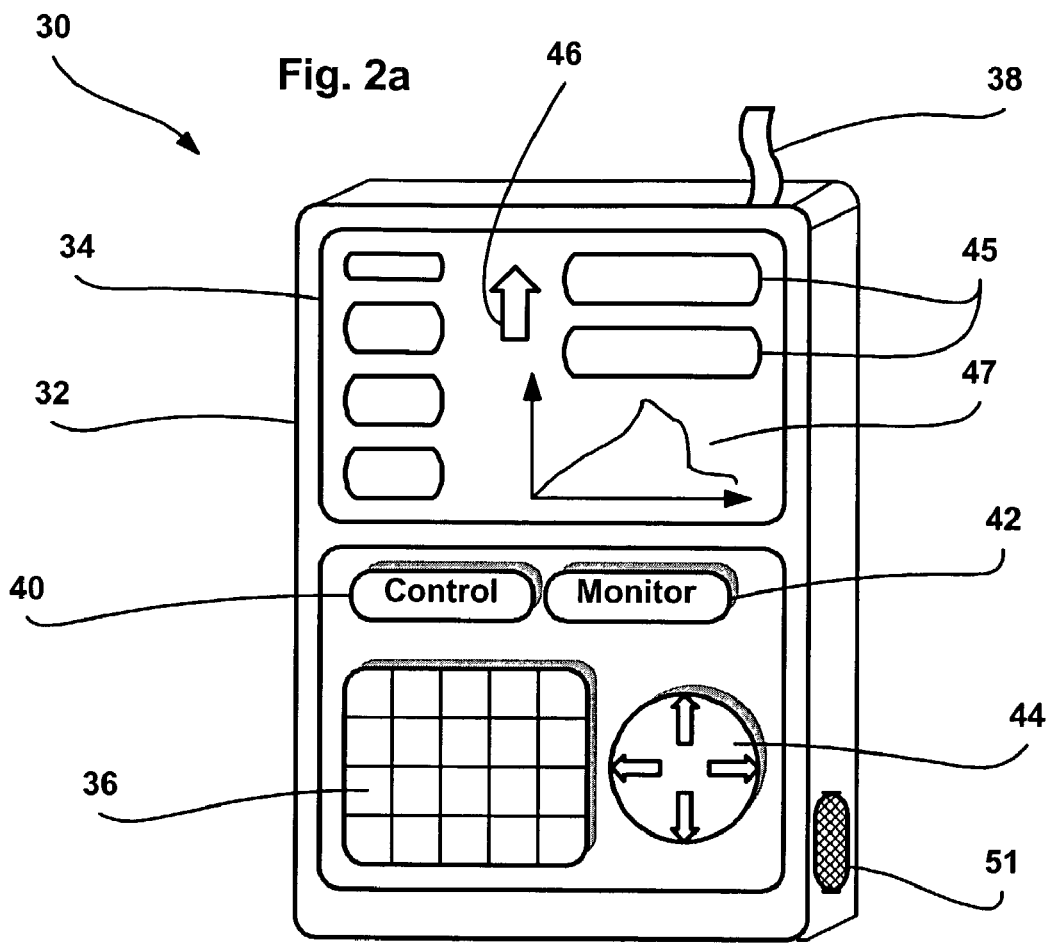
FIG. 2a is a perspective view of an exemplary wireless information device WID used with the present invention.
Figure 2B:
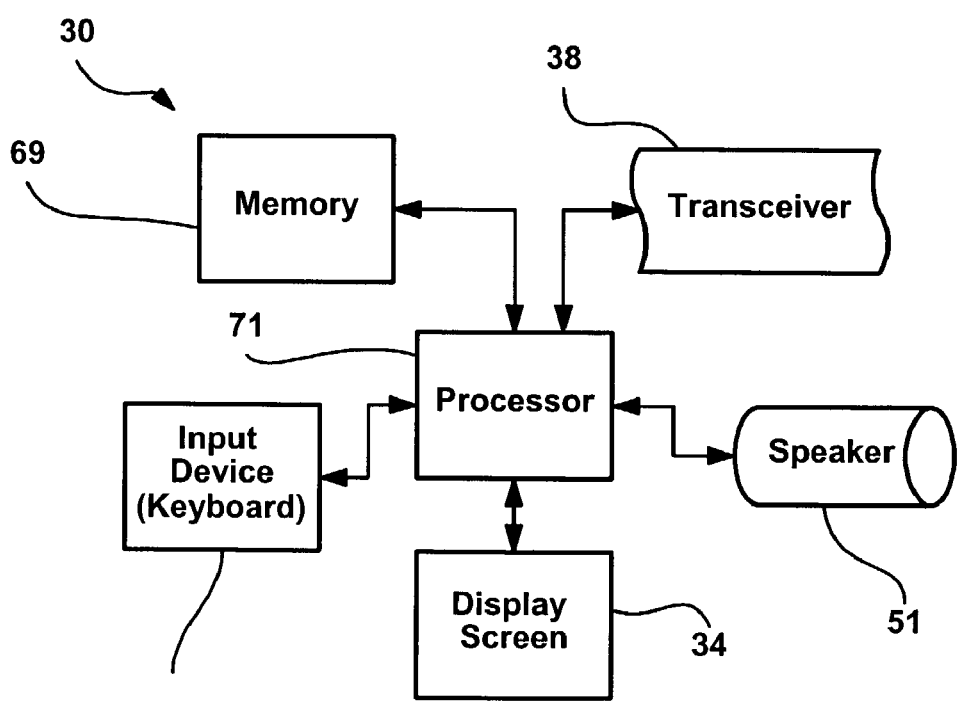

Referring now to FIG. 2a, a perspective view of an exemplary WID 30 is illustrated. Other components of exemplary WID 30 are illustrated in FIG. 2b. Exemplary WID 30 includes, generally, a plurality of components that are mounted within a hardened plastic or metallic housing identified by numeral 32. WID 30 components include a processor 71, an input device (e.g., keyboard 36), a display screen 34, a speaker 51 for audio output, a transceiver 38 and a memory 69. Processor 71 is linked to each of the input device, display screen 34, speaker 51, transceiver 38 and memory 69 for communication therewith. Processor 71 is equipped to run various programs for both displaying information via screen 34 and for receiving control signals and communicating those control signals to access points 11 (see again FIG. 1) via transceiver 38.

The input device may include any of several different types of input components including a typical push-button keyboard 36, separate selection buttons 40 and 42, a rocker-type selection button 44, and/or selectable icons that may be provided via display screen 34 such as, for instance, icons 45. It is contemplated that, in at least one embodiment, a pointing cursor 46 may be movable about screen 34 and placed over one of the selectable icons (e.g., 45) after which a conventional type mouse clicking action may be used to select one of the icons to cause some display or control function to occur. In other embodiments display 34 may comprise a touch screen where icons are selectable via a stylus or the tip of an operators finger.

Display screen 34 may be any type of conventional display screen suitable for a handheld device and, for example, may be equipped to display numeric information, icons, graphs such as graph 47, bar charts, or any other type of monitoring and control information that may be associated with facility machines.

Speaker 51 is a conventional small audio output speaker which may be used for any purpose such as providing an audible indication when a WID 30 is removed from a zone, providing operating characteristics in an audible manner, etc.

Transceiver 38 is mounted proximate the top end of housing 32. As in the case of the transceivers that comprise access points 11, transceiver 38 is capable of transmitting electromagnetic signals and also receiving such signals so that information can be provided to controller 38 or received from controller 38 via access points 11.

Memory 69 stores the programs performed by processor 71 and also, in at least some embodiments of the invention, stores a WID identifier (e.g., a WID number, a WID user identification number, etc.). It is contemplated that some WIDs 30 may only be configured to provide access information and, in this case, the programs stored in memory 69 may only be access type programs. Where a WID 30 is equipped with control capabilities, control programs are stored in memory 69.

In addition to enforcing zone rules for each facility machine, it is contemplated that, in at least one embodiment of the invention, the controller 38 and associated system components may also be used to enforce information restriction requirements within a facility. To this end, as in many industries, in the industrial automation industry, there are many different facility employee types that have access to facility machines M1–M10. Each of the facility employee types will typically perform specific tasks with respect to facility machines and, to that end, require specific types of information, specific information layouts and/or specific control capabilities. For instance, in the case of a maintenance engineer, the maintenance engineer may require the capability to cause machines to run through specific machining sequences that are different than sequences that a process engineer may require. In this case, it is desirable to restrict the process engineer from performing the maintenance type control sequences while enabling the maintenance engineer to perform those sequences. Similarly, often a process engineer will require the ability to modify machine control characteristics in a fashion that is different than would be required by a maintenance engineer and, to that end, the process engineer's WID 30 may be provided with certain functionality that the maintenance engineer's WID 30 is not. Furthermore, even amongst maintenance engineers, there may be certain engineers that require greater control latitude than other engineers and, in fact, some lower level maintenance engineers may be completely restricted from machine control and only be allowed to access or monitor machine operating characteristics. Here WID 30 capabilities can be used to enforce facility access and control requirements.

Referring now to FIG. 3, an authorization/preferences specification 39 that may be stored in database 40 (see again FIG. 1) is illustrated. Exemplary specification 39 includes six separate columns including a WID # column 130, a machine # column 132, an access authority # column 134, an access specification column 135, a control authority column 136 and a control specification column 138. As its label implies WID # column 130 lists a separate identifier or number corresponding to each of the WIDs 30 usable within a facility 10. For example, in FIG. 3, there are 1 through XX WIDs listed in column 130 and the identifiers are numbered 1 through XX.

As its label implies, machine # column 132 includes a list of all facility machines that can either be controlled or monitored via a WID for each WID identified in column 130. For instance, machines M1 through MNNN are listed for WID #1, machines M1–MNNN are separately listed for WID #2, and so on.

Access authority column 134 indicates, for each WID number and machine number combination in columns 130 and 132, whether or not the WID in column 130 has access authority for the machine in column 132. In column 134 a "Y" designator indicates at least some level of access authority while an "N" designation indicates no access authority for the particular WID—machine combination. For instance, in FIG. 3, WID #1 has at least some level of access authority for machines M1, M2, M4, M5, M7, M8 and MNNN and has no access authority for machines M3 and M6.

For WID number and machine number combinations where at least some level of access authority is allowed, different levels of access authority are identified by a qualifying number following each "Y" designation. To this end, in the exemplary specification 39, a "1" qualifier indicates full access authority meaning that the particular WID in column 130 can be used to access all information corresponding to the particular machine in column 132. Higher number qualifiers such as 2, 3, 4, etc., indicate lesser levels of access authority. For example, as illustrated in row 142 of FIG. 3, WID #1 has complete access authority for machine M1 while, as illustrated in row by 140, WID #1 has a second level of access authority (i.e., Y-2) for machine M4.

Access specification column 135 provides information that indicates how access information corresponding to a particular WID-machine combination from columns 130 and 132 should be displayed via the WID and may include, for instance, WID user preferences. For instance, two maintenance engineers may find different views of the same access information most helpful and information specifying preferred views is stored in the specification column 135. Default access specifications are contemplated in column 135 an "LOA" designator means that an associated WID lacks authority to access access information for the associated machine (i.e., LOA="Lack Of Authority").

Referring still to FIG. 3, control authority column 136 is similar to access authority column 134 and, to that end, includes "Y" and "N" designators and numerical qualifiers to indicate whether or not particular WIDs in column 130 have control authority and the degree of control authority those WIDs have over machines in column 132. For instance, WID #1 has a relatively low level control authority (i.e., Y-4) over machine #M1, has no control authority over machine #M2, no control authority over machine #M3, and so on. Note that with respect to at least some machines in column 132, some WIDs in column 130 may have access authority and not have control authority. For example, see row 144 where WID #1 has complete access authority over machine #M2 and has no control authority over machine #M2. Also note that different WIDs in column 130 have different levels of access authority and control authority over the same machines. For instance, in row 148, WID #2 has a low level (i.e., Y=8) of access authority in column 134 over machine #M1 while WID #1 has a high level of access authority over machine #M1. These different authority levels reflect the different information needs of facility employees. Also note that the same WID may have a high level of access authority and a low level of control authority over a specific machine (e.g., see row 149 where WID #2 has high level access and low level control over machine #M7).

Note that it is possible that, for a specific WID, the WID may not be authorized to obtain any information with respect to certain facility machines. I this case it is contemplated that some type of indicator would be provided to the WID user via the WID indicating lack of authority.

The control specification column 138 includes sets of preferences that indicate how control information should be displayed via a WID display for particular WID types or WID users. It is contemplated that the overall system may include canned control views that can be selected by WID users and that are then used to update the control specifications in column 138. In the alternative, it is also contemplated that, in at least some embodiments, some type of customization of views may be facilitated via either a WID 30 or some other type of commissioning interface such as a stationary PC, a dedicated controller 38 interface, etc.

Access and control authority may be assigned to specific WIDs in any of several different manners. For example, it is contemplated that some facilities may include WIDs that are used by many different facility employees where, when an employee enters a facility 10, the employee checks out an appropriate WID 30 from a central dispatch station. In this case, WIDs having certain capabilities would be checked out to appropriate employees. For instance, one type of maintenance WID 30 may be checked out to a particular maintenance engineer where the WID identifier (i.e., the number in column 130 of FIG. 3) is associated with appropriate access authority and control authority for the particular maintenance engineer. Where a process engineer checks out a WID 30, the process engineer would check out a WID having a WID identifier associated with monitor and control authority required by the process engineer.

In the alternative, WIDs 30 may be personalized. For instance, personal digital assistants (PDAs) may be used as WIDs 30. In this case, the WID identifier in column 130 of FIG. 3 may identify a particular PDA owner.

Figure 4:
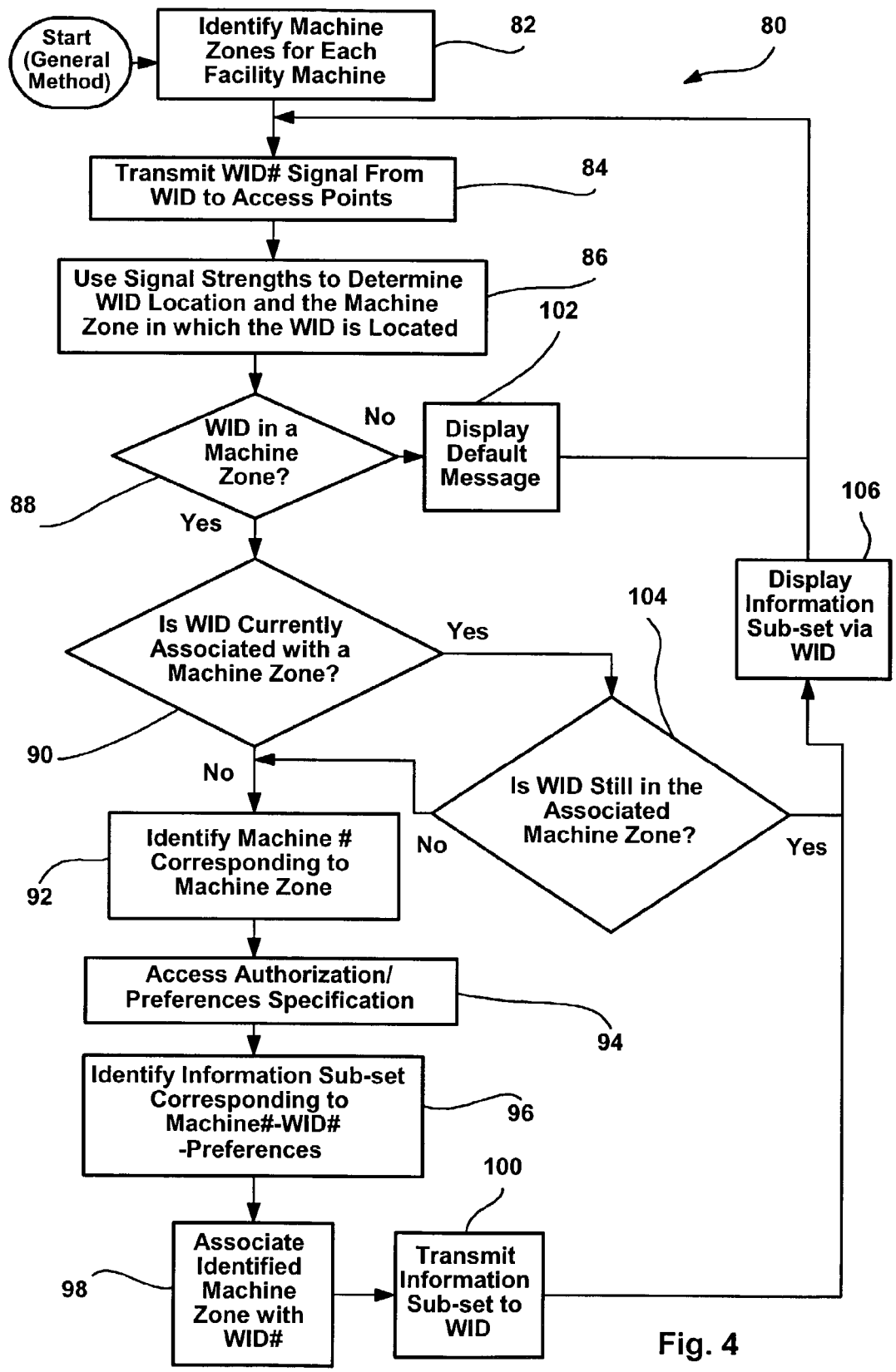
FIG. 4 is a flow chart illustrating one method for providing machine zone specific information to WID according to the present invention.

Referring now to FIG. 4, one method 80 according to the present invention is illustrated. Referring also to FIGS. 1, 2a, 2b and 3, at process block 82, machine zones for each machine M1–M10 within facility 10 are identified during a system commissioning procedure. The commissioning procedure in general, lays out the range of control zones, access zones and, where appropriate, hysteresis zones, for each particular machine. Various commissioning procedures for identifying machine zones are contemplated. After the control and monitor zones have been identified, an electronic map (e.g., see again FIG. 1) of the facility 10 including the identified zones is stored in database 40.

After the machine zones have been identified and electronically stored in database 40, when a WID 30 is turned on and is brought into a facility area 14, the WID 30 transmits the WID identifier or number at a specific and known signal strength to access points 11 proximate the WID 30 at block 84. When an access point 11 receives the transmitted signal, the access point 11 identifies the signal strength and the WID number and packages those two bits of information along with an access point identifier and transmits this information packet via data bus 36 to controller 38. At block 86, controller 38 uses the signal strengths and the access point identifiers to determine the location of the specific WID within room 14.

Any of several different methods to determine WID location using signal strength may be used. For instance, a signal triangulation method whereby the intersection of three access point signal strength circles is used to determine location may be employed. Other statistical methods of locating are also contemplated including those described in WO 02/054813 referenced above. At block 86, after WID 30 location has been precisely identified, controller 38 access the facility map in database 40 and determines in which, if any, machine zone the WID 30 is located.

Continuing, at decision block 88, controller 38 determine whether or not the WID is actually in a machine zone. For instance, in FIG. 1, the illustrated WID 30 is not within one of the identified machine zones but rather is in a buffer zone (e.g., 15) between machine zones. At block 88, where the WID is not within a machine zone, control passes to block 102 where the system causes WID 30 to display a default message. To this end, referring also to FIG. 6, in at least one embodiment, the process of displaying a default message includes transmitting a message such as "You are not currently in a machine zone." at block 150 to the WID 30 via access points 11 and then displaying the received message at block 152 via the WID.

This simple location status or guidance message reduces WID user confusion by giving some type of indication of where the WID user is with respect to the zones. For instance, referring again to FIG. 1, a WID user that resides to the left of machine M1 as illustrated and is proximate machine M1 may believe that he is within some type of machine zone corresponding to machine M1 when in fact the user is not within a machine zone.

At block 103, controller 38 disassociates the WID from all zones. Disassociation is provided in the illustrated embodiment ot ensure that, upon entering another machine zone, the WID 30 is free to re-associate or more properly, be re-associated by controller 38, with the new zone.

Figure 6:
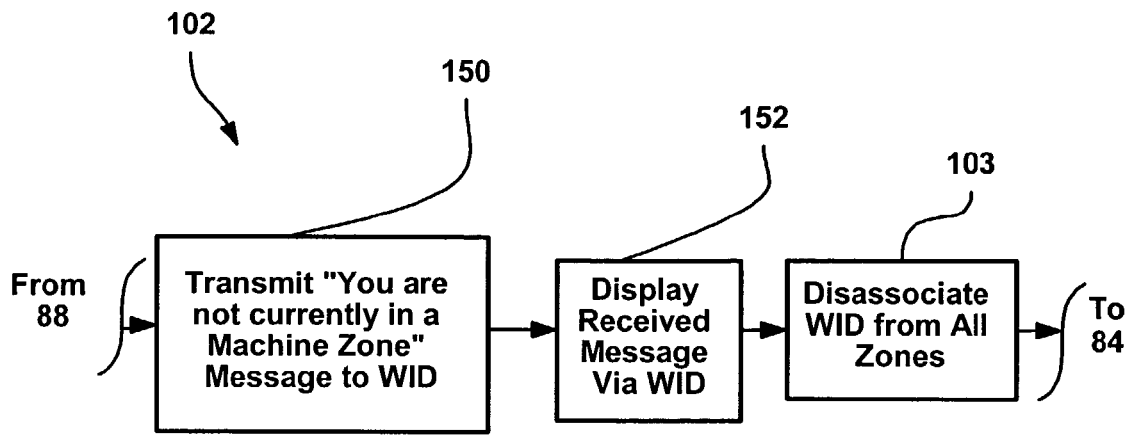
FIG. 6 is a flow chart illustrating the display default message process block of FIG. 4 in greater detail.

Referring again to FIGS. 1–4 and also to FIG. 6, after block 103, control passes back up to block 84 where the system again determines WID location within facility 10. Thus, where WID 30 is initially not within a machine zone but is moved into a machine zone, the looping process through blocks 84, 86, 88 and 102 eventually determines that the WID 30 is within a specific machine zone.

Referring again to block 88, where the WID 30 is within a machine zone, control passes to block 90 where controller 38 determines if the WID 30 is currently associated with a specific machine zone. To this end, where a WID 30 remains within one zone during consecutive passes through the process 80 in FIG. 4 or is moved from one zone directly into an adjacent zone (e.g., from zone 28 into zone 26 in FIG. 1)

between consecutive passes through process 80, during the second pass through process 80, at block 88, the WID 30 will be associated with the machine zone in which the WID resided during the first pass through process 80.

In this case, control passes to block 104 where controller 38 determines if the WID 30 is still in the machine zone that the WID was most recently (i.e., during the previous pass through process 80) associated with. Here, for instance, were the WID 30 remains in the same zone during consecutive passes through process 80, the WID will still be in the associated machine zone and control passes to block 106. At block 106 controller 38 causes WID 30 to display the sub-set of machine information corresponding to the zone that the WID is associated with and control again passes back up to block 84 where the process 80 is repeated. By looping back up through block 106 instead of down through the lower blocks in FIG. 4 when the WID zone remains the same between consecutive process 80 cycles, unnecessary steps required to re-associate a WID and a machine zone are avoided (i.e., the WID and zone above-referenced already associated). The end result is that the information sub-set displayed by the WID 30 remains unchanged between consecutive process cycles where the WID zone is unchanged.

Where, however, the WID 30 is in a machine zone that is different than the currently associated machine zone (e.g., the WID 30 has been moved from zone 28 into zone 26 between consecutive process 80 cycles), control passes from block 104 to block 92. Similarly, where the WID 30 is not currently associated with a machine zone at block 90, control passes to block 92.

At block 92, controller 38 identifies the machine number corresponding to the machine zone in which the WID 30 is currently located. At block 94, controller 38 access the authorization/preferences specification 39 that is stored in database 40 and at block 96 controller 38 identifies an information sub-set corresponding to the machine number, the WID number and specifications as specified in specification 39 (see again FIG. 3). For instance, where WID #1 in column 130 of FIG. 3 is located within zone 26 of FIG. 1 (i.e., the access zone corresponding to machine #M4), the information sub-set will be the sub-set corresponding to machine #M4, access authority Y-2 and access specification Spec-3.

Referring still to FIGS. 1 through 4, at block 98 controller 38 associates the identified machine zone with the WID number and control passes to block 100. At block 100 controller 38 causes one or more access points 11 proximate the WID location to transmit the information sub-set to the WID 30. Here, the WID identifier is appended to the transmitted information to ensure that only the specific WID within the zone receives the transmitted information. Continuing, at block 106, the WID 30 displays the information sub-set corresponding to the authorization/preferences specification for the particular zone and the particular access and/or control authority associated with the WID. Next, control passes back up to block 84 where the process is repeated.

In addition to providing access information and control information, controller 38 may be programmed to provided additional information to reduce WID operator confusion. For instance, where a particular WID 30 is located within a particular machine zone but the WID is not associated with a particular authority level that allows the WID to provide monitor and/or control authority, authorization messages to that effect may be provided. To that end, referring again to FIG. 4 and also to FIG. 5, one sub-process corresponding block 96 is illustrated in greater detail in FIG. 5.

Figure 5:
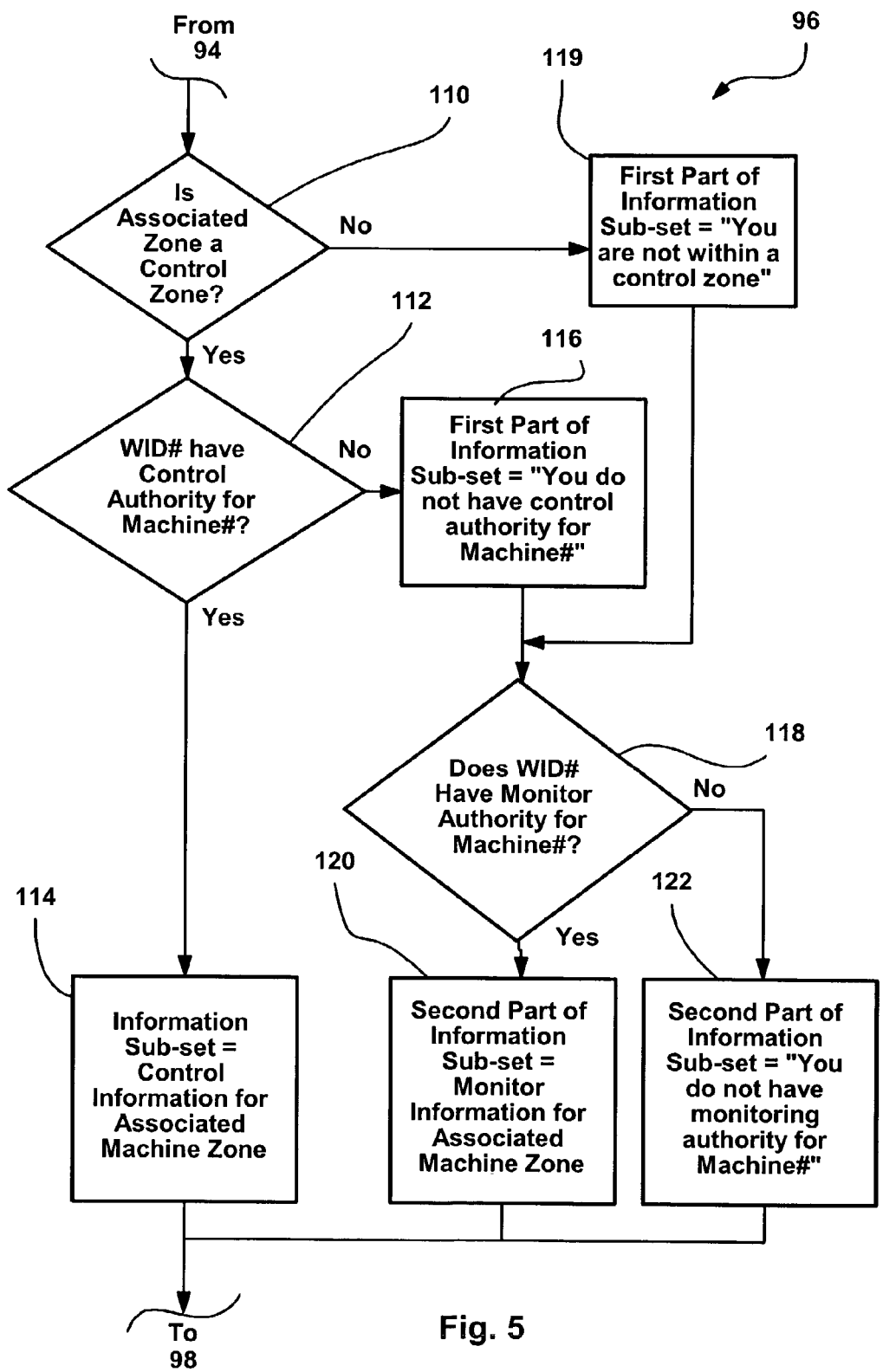
FIG. 5 is a flow chart illustrating the information sub-set identifying process blocks of FIG. 4 in greater detail.

Referring to FIGS. 1, 4 and 5, after block 94 where the WID has been moved into a new machine zone since the last pass through process 80 and an associated machine zone has been identified, in at least one embodiment of the invention, control passes to block 110 where controller 38 determines whether or not the associated zone is a control zone. Where the associated zone is not a control zone, control passes to block 119 where a message such as "You are not within a control zone." is provided as a first part of the information sub-set. Thereafter control passes to block 118.

Referring again to block 110, where the associated zone is a control zone, control passes to block 112 where the controller 38 uses specification 39 (see again FIG. 3) to determine whether or not the WID has control authority for the machine associated with the zone in which the WID currently resides. Where the WID does not have control authority for the specific machine, control passes to block 116 where a message such as "You do not have control authority for machine #." is provided as the first part of the information sub-set. After block 116 control passes to block 118.

At block 118, controller 38 determines whether or not the WID 30 has access authority for the specific machine. Where the WID does have access authority, control passes to block 120 where controller 38 provides the information associated with the particular machine zone and the access authority specified by specification 39 as the second part of the information sub-set.

Referring again to block 118, where the WID 30 does not have authority to access information for the particular machine, control passes to block 122 where the controller 38 provides a message "you do not have access authority for the machine #." as the second part of the information sub-set.

Referring again to block 112, where the WID has control authority for the particular machine, control passes to block 114 where controller 38 provides the control information for the associated machine zone as the information sub-set.

After each of blocks 114, 120 and 122, a complete information sub-set has been provided which either provides control information, access information and a message indicating that the WID is not in a control zone, access information and a message indicating that the user does not have control authority for the particular machine, a message that the WID is not within a control zone and the WID does not have access authority for the machine or a message that the WID does not have control authority and does not have access authority for the particular machine. After each of process blocks 114, 120 and 122, control passes back to block 98 in FIG. 4 and other parts of process 80 are resumed.

Figure 7:
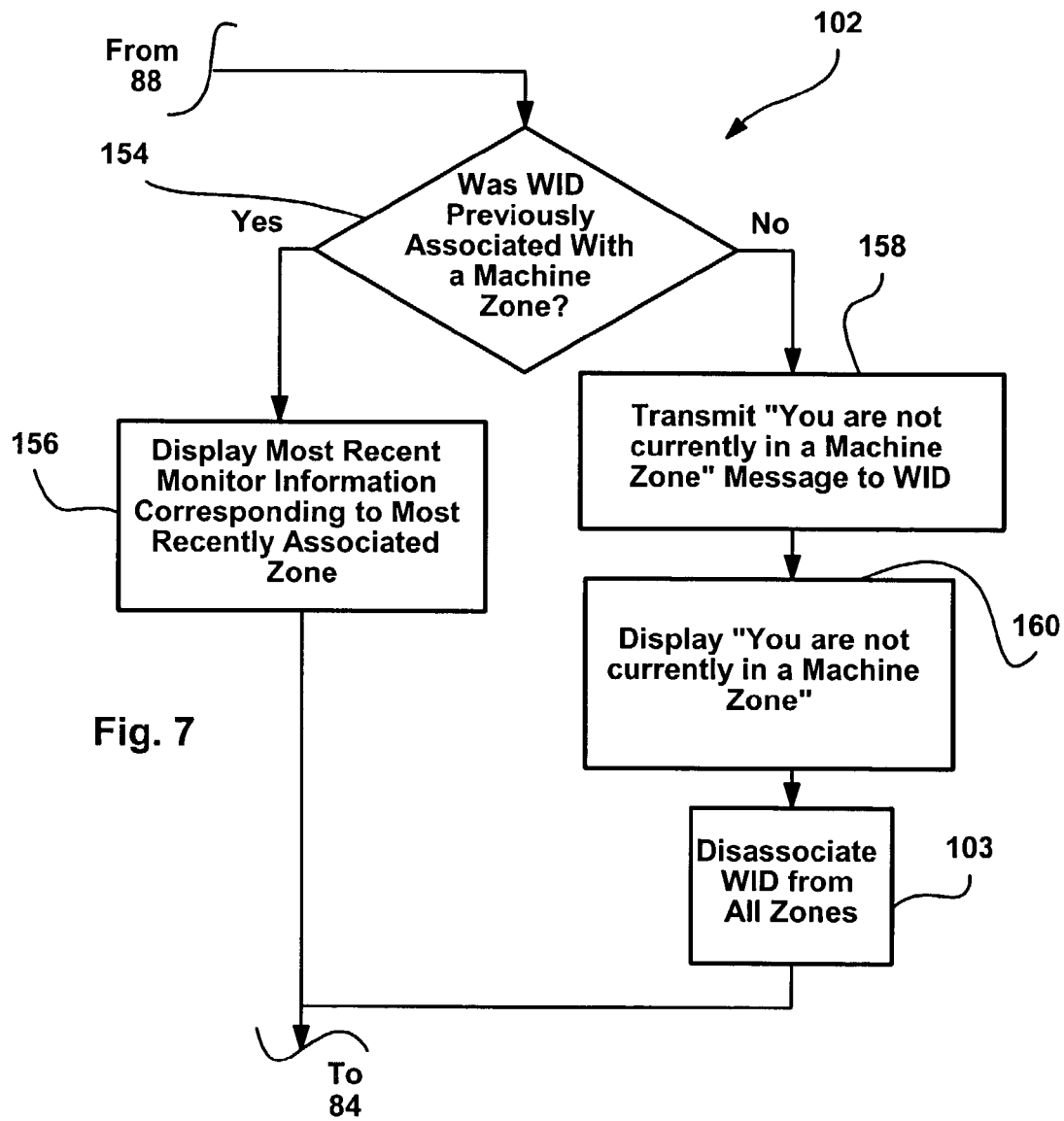
FIG. 7 is similar to FIG. 6 albeit illustrating a different detail of the display default message process block.

Referring again to FIG. 4 and also to FIG. 7, an alternate default message process 102 is illustrated in FIG. 7. Referring also to FIGS. 1 and 2, in FIG. 7, at block 154, controller 38 determines whether the WID 30 was previously associated with a machine zone. Here, for instance, between consecutive process 80 cycles in FIG. 4, a WID 30 may have been moved from within a machine zone (e.g., 26 in FIG. 1) into one of the buffer zones that is not associated with a particular machine. Where the WID was previously associated with a machine zone, control passes to block 156 where controller 38 allows the WID to display the most recent monitor information corresponding to the most recently associated zone. Thus, for instance, again referring to FIG. 1, where WID 30 is moved from within zone 26 into one of the buffer zones between consecutive process 80 cycles, the process illustrated in FIG. 7 causes WID 30 to continue to display the most recently displayed monitor information corresponding to machine #M4 while WID 30 remains in a region that is not within some other machine zone. Where the WID was not previously associated with a machine zone, control passes to block 158 where controller 38 transmits a message such as "You are not currently in a machine zone." to the WID 30 via proximate access points 11. At block 103 the WID 30 displays the received message. After each of blocks 156 and 103 control again passes to block 84 in FIG. 4.

Figure 8:
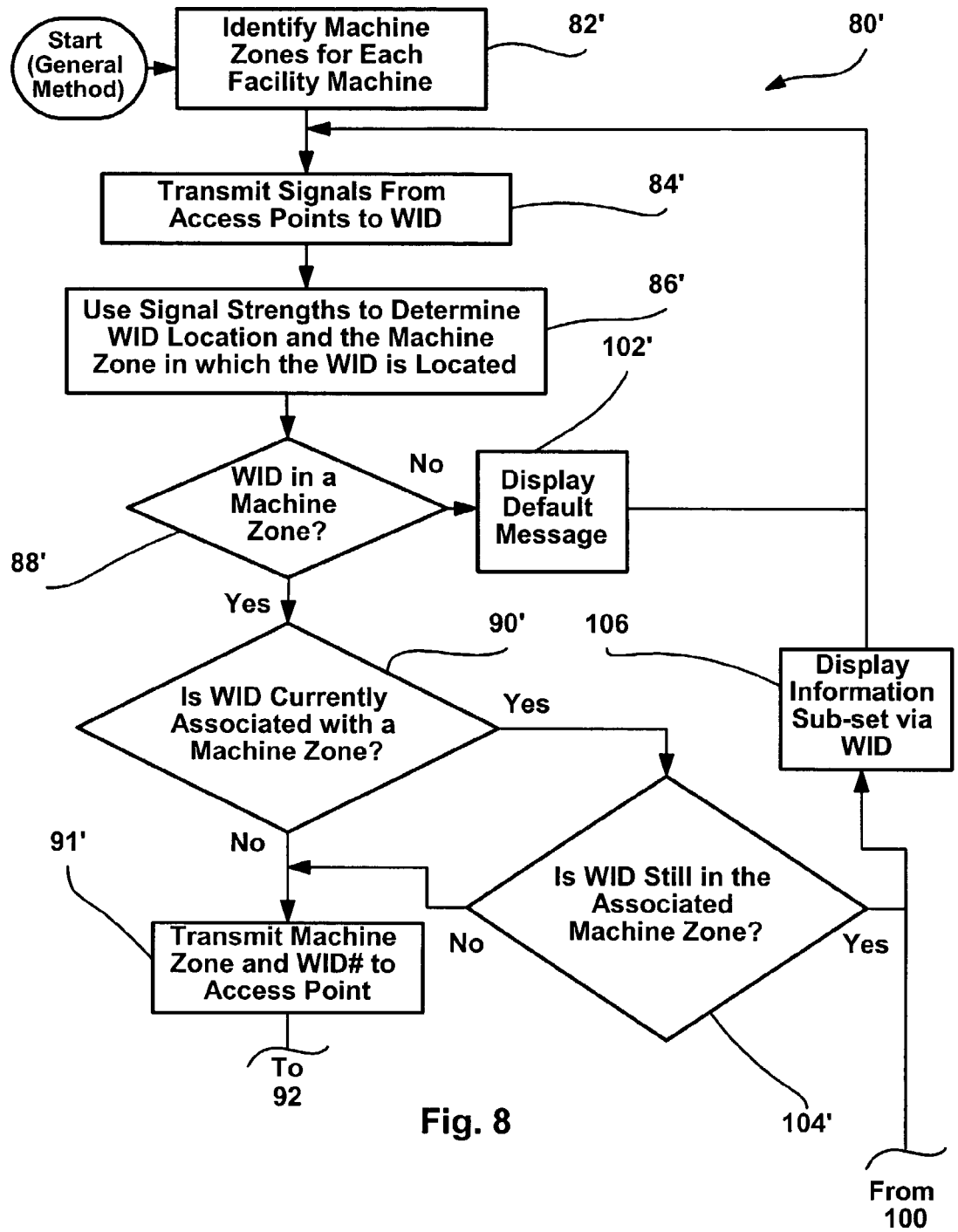
FIG. 8 is a flow chart illustrating an alternate first portion of the method of FIG. 4.

While the embodiment described with respect to FIG. 4 calls for WID 30 to transmit signals to access points 11 and controller 38 identifies WID 30 location, it is contemplated that a reverse process may be performed to identify WID location. To this end, controller 38 may cause each of access points 11 to periodically transmit signals from indicating access point identifiers to WID 30 and WID 30 then determines WID location within facility 10 as a function of known information about the layout of access points 11. A process 80' consistent with this alternate embodiment of the invention is illustrated in FIG. 8. In FIG. 8, several of the process steps illustrated are similar to the steps required by the process of FIG. 4 and some of the steps are identical to the steps of FIG. 4. For this reason, steps in FIG. 8 that are similar to the steps in FIG. 4 are identified by the same number followed by a "'" and identical steps are identified by the same numerals. For example, the step of displaying the information sub-set 106 is essentially identical in each of FIGS. 4 and 8 and therefore is identified by the same number 106 while the signal transmission steps 84 and 84' are only similar.

Referring now to FIGS. 1–3 and also to FIG. 8, at block 82', after zones corresponding to each of the facility machines M1–M10 have been identified, an electronic facility map consistent therewith is stored in the WID memory 69 (see again FIG. 2b). Thereafter, at block 84', controller 38 causes access points 11 to transmit access point identifier signals of a specific and known strength to WID 30. At block 86', WID 30 uses the received signals to determine WID location and also to determine the machine zone in which the WID is located (WID 30 may also relay the signals to Controller 38). At block 88', WID 30 determines whether or not the WID is within a machine zone. Where the WID is not within a machine zone control passes to block 102' where the WID displays a default message. The default message may take any of several different forms and, in at least two embodiments, would take the forms described above with respect to block 102 in FIG. 4 (see FIGS. 6 and 7 in this regard). After block 102' control passes to block 84'.

Referring again to block 88', where the WID 30 is within a machine zone, control passes to block 90' where the WID processor determines whether or not the WID is currently associated with a machine zone. Where the WID is currently associated with a machine zone control passes to block 104' where the WID determines whether or not the WID is still in the associated machine zone. Where the WID is still in the associated machine zone, control passes to block 106 where the WID displays the information sub-set corresponding to the associated zone.

Referring again to block 90', where the WID 30 is not currently associated with a machine zone, control passes to block 91' where the WID transmits the machine zone and the WID identifier (i.e., the WID #) to proximate access points 11 which in turn transmit the received information to controller 38. Referring again to block 104', where the WID is not in the associated machine zone, control passes to block 91' where, again, the WID 30 transmits the machine zone and the WID identifier to proximate access points 11 for delivery to controller 38.

After block 91', control passes to block 92 in FIG. 4 and the process in FIG. 8 cycles through process block 92, 94, 96, 98 and 100 prior to looping back up to block 106 in FIG. 8.

Where a WID is located within a control zone and the WID is authorized to receive control information and facilitate machine control, the information provided to the WID will be used to automatically configure the WID to facilitate the authorized control functions. To this end, referring again to FIG. 2a, the control information and control specification transmitted to a WID 30 may configure specific hardware input devices such as keyboard 36, buttons 40, 42 and/or 44 in machine specific ways. In the alternative, the control information and specification may cause icons such as icons 45 or other display type interface tools such as pull down menus, touch selectable icons, etc., to be provided on display 34. Cursor 46 is a selection pointer.

Figure 9:
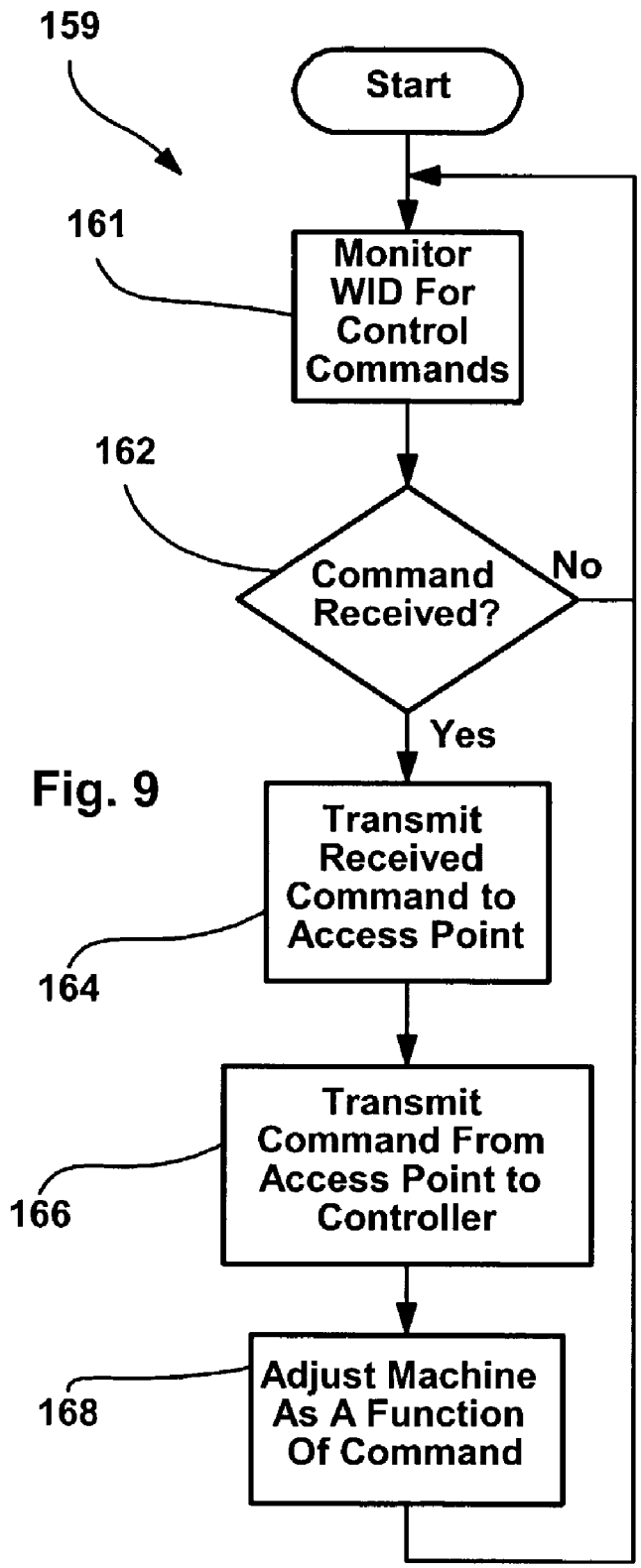
FIG. 9 is a flow chart illustrating a control loop according to the present invention.

After a WID 30 has been configured for control, the WID 30, access points 11 and controller 38 cooperate to facilitate a control loop. To this end, referring now to FIG. 9, an exemplary control loop 159 is illustrated. Referring also to FIGS. 1, 2a and 2b, at block 161, the WID processor 71 monitors the WID input devices for any control commands. Where no control commands are received at block 162, control passes back up to block 161 and the monitoring process is repeated. However, at block 162, where a command is received, control passes to block 164 where processor 71 transmits the received command via transceiver 38 to access points 11. At block 166, the access points 11 transmit received commands to controller 38. At block 168, controller 38 adjusts machine operation as a function of the received commands. The process 159 in FIG. 9 operates in parallel with the process in FIG. 4 after the control specification is used to configure the WID 30 appropriately and while the WID remains in an associated zone.

Figure 10:
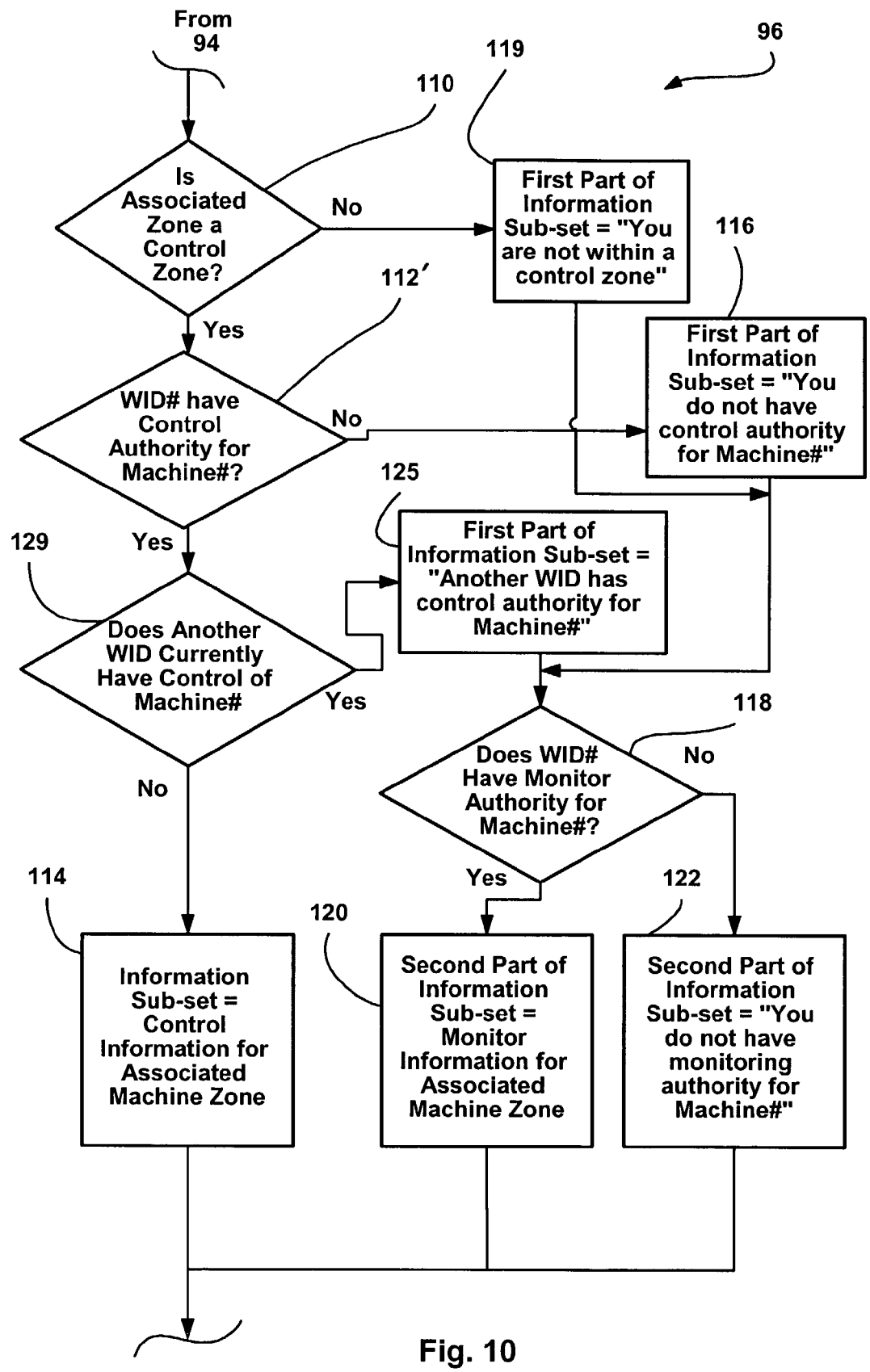
FIG. 10 is a flow chart similar to FIG. 5, albeit illustrating an alternate sub-process.

In addition to enforcing zone rules and monitoring control authority rules as described above, the inventive system can also be used to enforce other facility rules. For example, it may be desirable to limit control of a machine to a single WID user at any given time while allowing multiple WID users to access information corresponding to one machine at the same time. An exemplary method 96 for limiting machine control to a single WID is illustrated in FIG. 10. Referring also to FIG. 4, the process of FIG. 10 represents to a second detailed process corresponding to process block 96. In addition, comparing FIGS. 5 and 10, it should be appreciated that the processes associated with blocks 110, 116, 118, 114, 120 and 122 are essentially identical between the two processes. Block 112' in FIG. 10 is similar to block 112 in FIG. 5 except that, when a WID has control authority for a particular machine, instead of passing control to block 114 as in FIG. 5, the process of FIG. 10 passes control to block 129. Thus, when a WID is within a associated control zone and is authorized to control the machine corresponding to the associated zone, control passes to block 129 where controller 38 determines whether or not some other WID is currently controlling the particular machine.

Where no other controller is currently controlling a particular machine, control passes to block 114 and, as in the process of FIG. 5, controller 38 provides the control information for the associated machine zone as the information sub-set. However, at block 129, where another WID is currently controlling the particular machine, control passes to block 125. At block 125, controller 38 provides a message such as "Another WID has control authority for the machine." as the first part of the information sub-set (i.e., control information for the particular machine is not provided to the WID despite the fact that the WID is authorized to control the particular machine).

From block 125 control passes to block 118 where, consistent with the method of FIG. 5, the controller 38 determines whether or not the WID has authority to obtain and display access information. Control continues through blocks 120 and 122 and then cycles back to block 98 in FIG. 4.

Figures 11, 12:
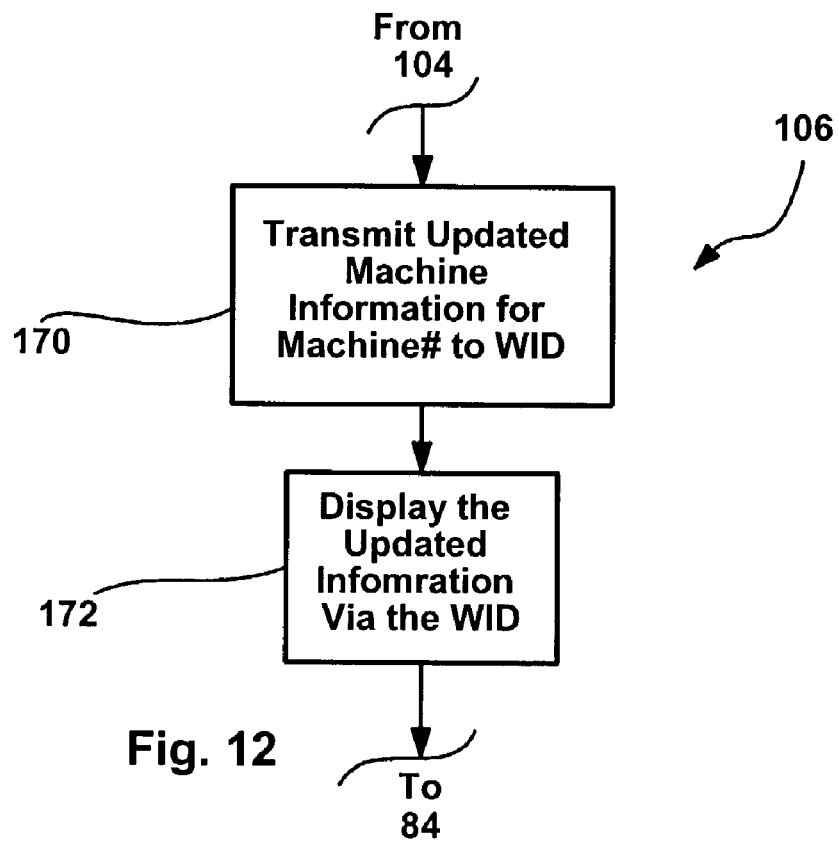
FIG. 11 is a flow chart illustrating detail of a sub-set that may be included in the FIG. 4 process.
FIG. 12 is a schematic diagram illustrating a current machine control table that may be stored in the database of FIG. 1 to facilitate one aspect of the present invention.

Referring now to FIG. 11, to facilitate the process corresponding to block 129 in FIG. 10, a current machine control table 180 may be stored in database 40 (see again FIG. 1) where controller 38 keeps track of WIDs that are currently controlling particular facility machines. To this end, the current machine table 180 includes three columns including a machine number column 182, a currently controlling WID # column 184 and a queued WID column 186. In machine number column 182, as the label implies, each machine currently controlled by one of the WIDs is listed. In column 184 a single WID identifier (i.e., a WID #) is provided for each machine listed in column 182 to indicate which WID is currently controlling a particular machine. Column 186 includes a list of other WIDs that are currently in a control zone and are authorized to control an associated machine and that are not provided with control information because of the one WID control rule enforced within the facility 10. The WID identifiers in column 186 may be queued in a first-in-first-out fashion. In this regard, it is contemplated that controller 38 may monitor situations where two or more WIDs authorized to control a particular machine are within an associated control zone so that when the WID that is currently controlling the machine leaves the zone, the controller 38 can automatically provide control information to the next WID in the queued column 186. For instance, where WID#6 is removed from the control zone corresponding to machine #M4, if WID#2 remains in the machine #M4 control zone, controller 38 moves WID#2 into column 184 replacing WID#6, modifies the queue in column 186 and transmits control information to WID#2 that is consistent with the authorization/preferences specification 39 in FIG. 3.

It has been contemplated that, at least with respect to some machines, operating characteristics may be changing rapidly and therefore, in at least one embodiment of the invention, it may be desirable to provide real time information to WIDs that are authorized to receive such information and that are in appropriate machine zones. To this end, referring to FIGS. 4 and 12, one exemplary method for displaying the information sub-set at process block 106 is illustrated in FIG. 12. To this end, at block 170, controller 38 transmits updated machine information for an associated machine to a specific WID and at block 172 the WID 30 receiving the information displays the updated information. This real time updating process continues while the WID 30 remains in the monitor zone corresponding to the particular machine.

Figure 13:
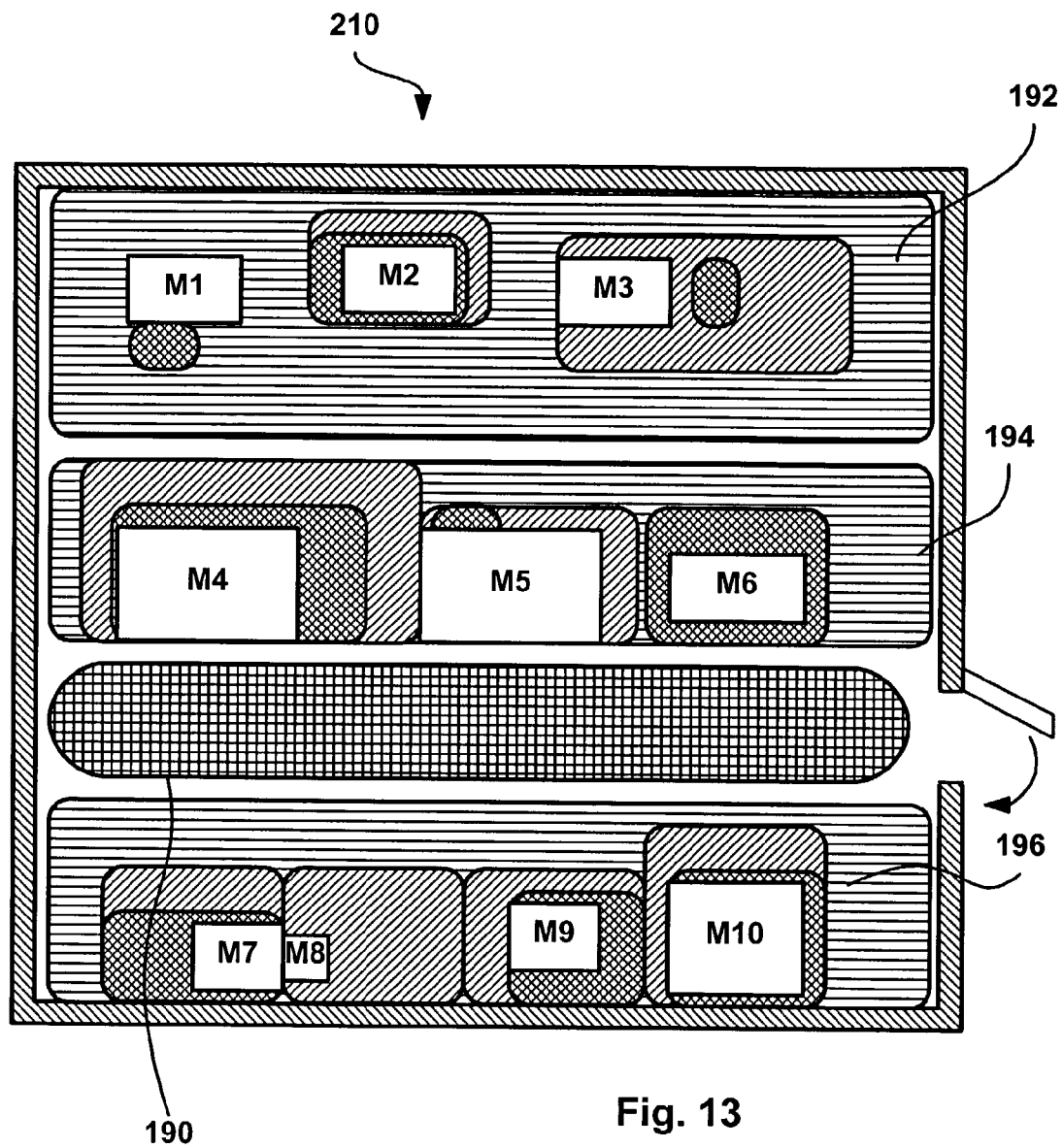
FIG. 13 is an exemplary facility map similar to the schematic of FIG. 1, albeit including area and sub-area zones.

Referring now to FIG. 13, a second exemplary facility area zone map 210 is illustrated which, in addition to control zones (e.g., the double cross-hatched zones) and machine access zones (e.g., the single right to left cross-hatched zones), includes an area zone 190, and three sub-area zones 192, 194 and 196, respectively. Area zone 190 is double cross-hatched with vertical and horizontal cross-hatches while each of the three sub-area zones is horizontally cross-hatched.

Figure 14:
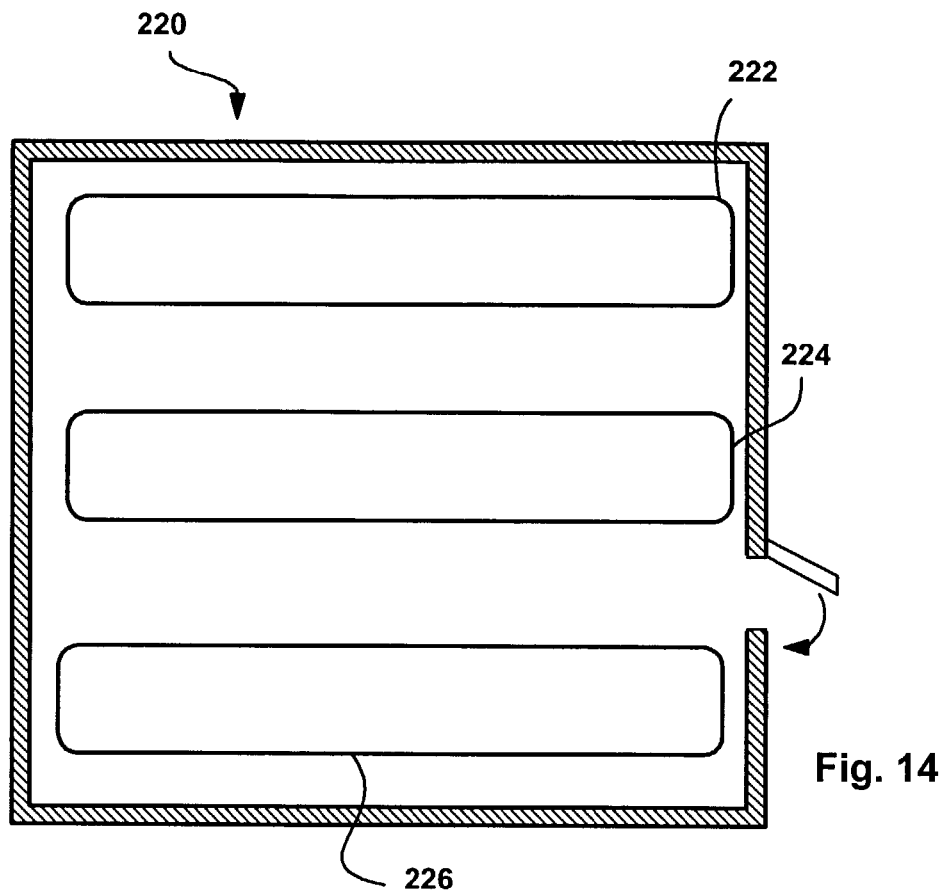
FIG. 14 is an exemplary terse area map corresponding to the map of FIG. 13 that may be provided via a WID screen shot.

It is contemplated that, in addition to having zones associated with each machine, zones may be associated with facility areas and sub-areas where information more general than machine associated information is provided in the area and sub-area zones. For example, referring to FIG. 13, assume that machines M1 through M10 are arranged along three separate machine lines L1, L2 and L3 where the lines L1, L2 and L3 include machines M1–M3, M4–M6 and M7–M10, respectively. In this case, according to at least some embodiments of the invention, immediately upon entering an area, a WID user may enter an area zone 190 wherein the WID is provided with an area map that provides very terse information regarding area machine lines. An exemplary terse machine line map 220 is illustrated in FIG. 14 and generally includes an area outline and icons 222, 224 and 226 that indicate the general locations of machine lines L1, L2 and L3, respectively, within the area 14.

Referring still to FIG. 13, while the WID operator (e.g., the WID 30) remains in area zone 190, the terse area map 210 remains on the WID screen. If that WID is moved from the area zone 190 into one of the sub-area zones (e.g., 192, 194, 196) associated with one of the machine lines L1 through L3, the information provided to WID 30 is automatically changed to display machine line specific information such as a machine line map. An exemplary machine line map screen shot 230 associated with machine line L2 (e.g., machines M4–M6 in FIG. 13 is illustrated in FIG. 15) while a similar exemplary machine line map screen shot 240 associated with machine line L3 (e.g., machines M7–M10 in FIG. 13) is illustrated in FIG. 16.

Figure 15:
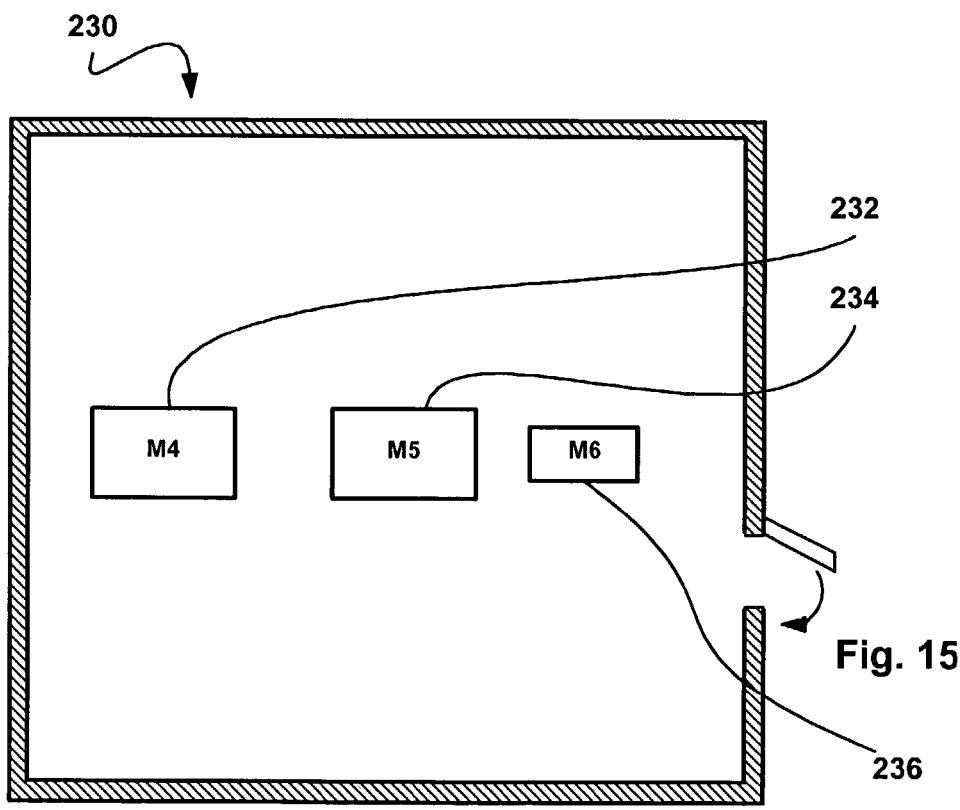
FIG. 15 is an exemplary terse machine line map corresponding to the maps of FIGS. 13 and 14.
Figure 16:
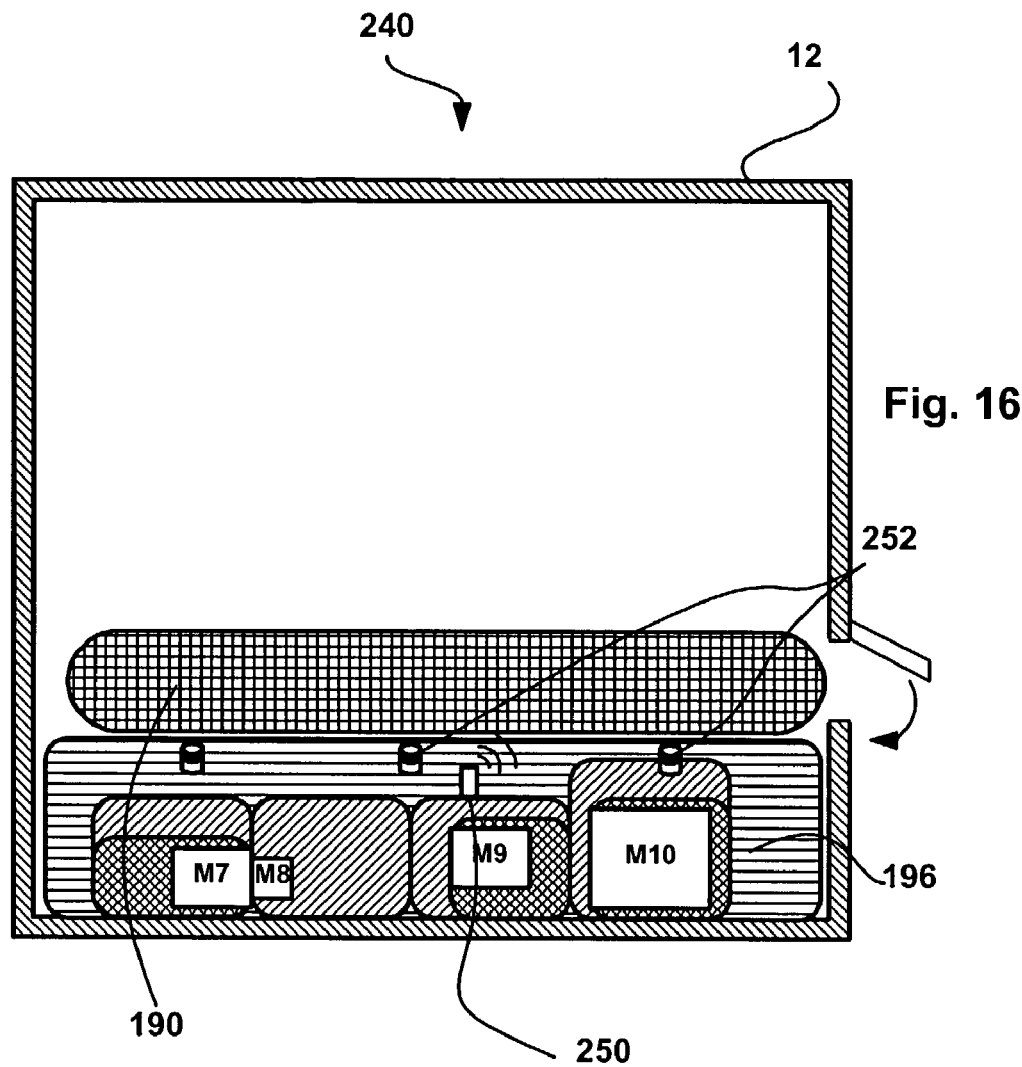
FIG. 16 is an exemplary relatively more detailed machine line map corresponding to the maps of FIGS. 13 and 14.

In FIG. 15 the three machines and their relative juxtapositions are illustrated and identified by numeral 232, 234 and 236. The FIG. 15 depiction is relatively simple. In contrast, the FIG. 16 depiction of machines M7–M10 that comprise the third machine line is relatively complex and includes zone indications such as area zone 190, sub-area zone 196 and various control zones corresponding to each of machines M7 through M1. In addition, screen shot 240 also identifies WID location via a WID icon 250 so that WID position relative to zones is known. Moreover, screen shot 240 also illustrates proximate access points via access point icons 252 which can be used by the WID operator to further orient the WID operator within the area of the facility. When the WID is moved from within a sub-area (e.g., 196) into one of the access or control zones, the WID would operate as described above to provide access and/or control information for the associated machine where appropriate.

Thus, the area and sub-area concepts described above help a WID user orient himself within a facility to locate specific machine lines and associated machines.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims. For example, the invention covers other embodiments where an area zone (see 190 in FIG. 13) may include all areas that are outside sub-area zones (e.g., 192, 194 and 196 in FIG. 13) that are within the facility. In addition, any relatively accurate locating system for determining WID location and zone presence may be employed in certain embodiments. Moreover, not all described aspects are required in all embodiments.

To apprise the public of the scope of this invention, the following claims are made:

What is claimed is:

1. A method for providing information corresponding to one of several machines to a wireless interface device (WID) where the machines are located within a facility and at least a sub-set of the machines are located within a facility space, the method comprising the steps of:

identifying zones within the facility including a separate machine zone adjacent each of the machines within the space;

identifying the location of the WID within the facility;

determining if the WID location is within a machine zone;

where the WID is located within a machine zone associated with a specific machine, identifying machine information related to the specific machine;

transmitting at least a sub-set of the machine information to the WID; and presenting the received information via the WID.

2. The method of claim 1 for use with a wireless network including a plurality of access points positioned throughout the facility and wherein the step of identifying the WID location includes determining the approximate distances between a sub-set of the access points and the WID.

3. The method of claim 2 wherein the step of determining the approximate distances includes transmitting signals between the WID and the access points, receiving the transmitted signals and comparing relative strengths of the received signals.

4. The method of claim 3 wherein the step of transmitting includes transmitting from at least three access points to the WID.

5. The method of claim 3 wherein the wireless network includes a plurality of channels for simultaneous communication and the step of transmitting includes transmitting signals from each access point along at least a sub-set of the plurality of channels and wherein the step of comparing includes applying a statistical model corresponding to the facility to the received signals to determine WID location.

6. The method of claim 1 further including the step of storing a WID identifier in the WID, the step of identifying machine information including identifying the WID identifier and selecting a sub-set of the machine information corresponding to the identified WID identifier.

7. The method of claim 6 wherein each WID identifier is associated with a specification related to the information that can be transmitted to the WID associated with the identifier and, wherein, the step of selecting the sub-set of information includes selecting a sub-set that is consistent with the specification.

8. The method of claim 7 wherein at least a sub-set of the specifications indicate that no information is associated with the WID identifier and wherein the step of transmitting includes transmitting an indication that no information is associated with the WID.

9. The method of claim 7 wherein each specification includes at least one authority indicator indicating the types of information accessible via an associated WID and wherein the step of selecting the sub-set of information includes selecting a sub-set that is consistent with the information authority indicator.

10. The method of claim 7 wherein each specification includes at least one information presentation specification indicating information presentation preferences and wherein the method further includes the step of formatting the sub-set of information according to the information presentation specification, the step of transmitting includes transmitting the formatted information and the step of presenting includes presenting the information in a format consistent with the presentation specification.

11. The method of claim 6 wherein the step of transmitting at least a sub-set of the machine information to the WID includes transmitting the WID identifier along with the information sub-set thereby specifying the WID to receive the information sub-set.

12. The method of claim 6 wherein the step of identifying the WID identifier includes the step of transmitting the WID identifier from the WID via an access point to a machine controller.

13. The method of claim 1 wherein the received information includes a control interface specification for the specific machine and wherein the step of presenting includes configuring the WID to receive user control commands for the specific machine.

14. The method of claim 13 further including the step of, after the WID is located within a zone corresponding to a specific machine, monitoring WID location and, if the WID is removed from the zone, altering the information provided via the WID.

15. The method of claim 14 wherein the step of altering the information includes transmitting access information to the WID where the access information includes operating characteristics for the specific machine and presenting at least a sub-set of the access information via the WID.

16. The method of claim 15 wherein the step of presenting the access information includes presenting the access information until the WID is again located within a machine zone.

17. The method of claim 13 further including the step of receiving control commands for the specific machine via the WID and altering operation of the specific machine as a function of the received control commands.

18. The method of claim 17 wherein the step of altering operation includes transmitting the control commands from the WID via an access point to a machine controller and using the received control commands to alter machine operation via the controller.

19. The method of claim 1 wherein the WID is a first WID and the method is to be used with a plurality of WIDs and wherein, prior to transmitting to the first WID, the method includes the step of determining if a second WID is currently presenting a sub-set of the specific machine information within the machine zone and, if a second WID is currently presenting machine information, limiting the information transmitted to the first WID.

20. The method of claim 19 wherein the step of limiting includes transmitting a sub-set of the information that is being presented via the second WID.

21. The method of claim 20 wherein the step of transmitting a sub-set of information includes transmitting an indication that a second WID is presenting machine information related to the specific machine.

22. The method of claim 19 wherein the machine information includes a control interface specification for the specific machine useable to configure a WID to receive control commands and wherein the step of limiting includes transmitting the control interface specification to only one of the first and second WIDs.

23. The method of claim 1 further including the step of, after the WID is located within a zone corresponding to a specific machine, monitoring WID location and, if the WID is removed from the zone, altering the information provided via the WID.

24. The method of claim 23 wherein the step of altering includes halting provision of the information.

25. The method of claim 23 wherein the step of altering includes causing the WID to erase the information from its memory.

26. The method of claim 23 wherein the step of altering includes transmitting other information to the WID for presentation via the WID.

27. The method of claim 23 wherein the step of altering includes indicating that the WID has been removed from the zone.

28. The method of claim 1 wherein, for at least a sub-set of the machines within the space, the step of identifying machine zones includes identifying first and second machine zones where the first machine zone is smaller than the second machine zone and where first and second different sub-sets of machine information correspond to the first and second machine zones, respectively, the method further including the step of, where the WID is within one of the first and second zones corresponding to a specific machine, identifying which of the first and second zones the WID is in and, wherein the step of identifying machine information related to the specific machine includes the step of identifying the information sub-set corresponding to the identified zone.

29. The method of claim 28 wherein the second information sub-set includes access information and the first information sub-set includes control information for the specific machine and wherein the step of presenting includes configuring the WID as a function of the control information to receive control commands for the specific machine when the first information sub-set is transmitted.

30. The method of claim 1 wherein, for at least a sub-set of the machines within the space, the step of identifying machine zones includes identifying first and second machine zones where the first machine zone is smaller than the second machine zone and where the step of determining if the WID location is within a machine zone includes determining if the WID is located within the first machine zone, the method further including the step of, after the transmitting step, monitoring the WID location and continuing to provide the machine information until the WID is located outside the second machine zone and, when the WID is located outside the second machine zone, altering the provided information.

31. The method of claim 30 wherein the step of altering includes halting provision of the information via the WID.

32. The method of claim 1 wherein the machine information includes machine operating characteristics that are periodically updated and wherein the step of transmitting includes continually transmitting the updated characteristics to the WID.

33. The method of claim 32 further including the step of monitoring WID location and, when the WID is located outside the zone corresponding to the specific machine, stopping transmitting of the updated characteristics.

34. The method of claim 32 further including the step of monitoring WID location and, when the WID is moved to a location within another zone corresponding to a machine other than the specific machine, stopping transmitting of the updated characteristics corresponding to the specific machine.

35. The method of claim 32 further including the step of monitoring WID location and, when the WID is moved to a location within another zone corresponding to a machine other than the specific machine, providing an option to either continue to receive the updated characteristics corresponding to the specific machine or receive information corresponding to the other machine.

36. The method of claim 1 further including the step of, after the step of presenting, monitoring WID location and, when the WID is located outside the zone corresponding to the specific machine, halting presentation of the information sub-set.

37. The method of claim 1 further including the step of, after the step of presenting, monitoring WID location and presenting the machine information until the WID is located within another machine zone.

38. The method of claim 1 further including the step of, after the step of presenting, monitoring the WID for an indication from the WID user that the machine information should not be presented and, when an indication that the machine information should not be presented, halting presentation of the machine information.

39. The method of claim 1 wherein the step of identifying machine zones includes identifying non-overlapping machine zones.

40. The method of claim 1 wherein the step of identifying machine zones includes identifying machine zones where buffer zones are located between adjacent machine zones.

41. The method of claim 1 wherein the step of identifying zones further includes identifying facility sub-area zones that correspond to machine sub-sets where each machine sub-set includes a set of proximate machines and wherein the method further includes the step of, after determining the location of the WID, determining if the WID is within one of the sub-area zones and, when the WID is located within a sub-area zone associated with a specific machine sub-set, identifying information corresponding to the specific machine sub-set, transmitting at least a sub-set of the machine sub-set information to the WID and presenting the received information via the WID.

42. The method of claim 41 wherein the WID includes a display, the machine sub-set information includes a map of the machine sub-set and the step of presenting includes displaying the machine sub-set map via the WID.

43. The method of claim 1 wherein the machines within the space are dividable into machine sub-sets where each machine sub-set includes a set of proximate machines and wherein the step of identifying zones further includes identifying area zones that correspond to a plurality of proximate machine sub-sets and wherein the method further includes the step of, after determining the location of the WID, determining if the WID is within one of the area zones and, when the WID is located within an area zone associated with a specific plurality of machine sub-sets, identifying information corresponding to the specific plurality of machine sub-sets, transmitting the plurality of machine sub-sets information to the WID and presenting the received information via the WID.

44. The method of claim 43 wherein the WID includes a display, the plurality of machine sub-sets information includes a map of the plurality of machine sub-sets and the step of presenting includes displaying the plurality of machine sub-sets map via the WID.

45. A method for providing information corresponding to one of several machines to a wireless interface device (WID) where the machines are located within a facility and at least a sub-set of the machines are located within a facility space, the method comprising the steps of:

storing a WID identifier in a WID;

identifying zones within the facility including a separate machine zone adjacent each of the machines within the space;

identifying the location of the WID within the facility;
determining if the WID location is within a machine zone;
where the WID is located within a machine zone associated with a specific machine, identifying the WID identifier;
identifying machine information related to the specific machine;
transmitting at least a sub-set of the machine information along with the WID identifier to the WID; and
presenting the received information via the WID.

46. The method of claim 45 wherein the step of identifying machine information includes selecting a sub-set of the machine information corresponding to the specific identified WID identifier.

47. The method of claim 46 wherein each WID identifier is associated with a specification related to the information that can be transmitted to the WID associated with the identifier and, wherein, the step of selecting the sub-set of information includes selecting a sub-set that is consistent with the specification.

48. The method of claim 47 wherein each specification includes at least one authority indicator indicating the types of information accessible via an associated WID and wherein the step of selecting the sub-set of information includes selecting a sub-set that is consistent with the information authority indicator.

49. The method of claim 45 wherein the step of identifying the WID identifier includes the step of transmitting the WID identifier from the WID via an access point to a machine controller.

50. A method for providing information corresponding to one of several machines to a wireless interface device (WID) where the machines are located within a facility and at least a sub-set of the machines are located within a facility space, the method comprising the steps of:
identifying zones within the facility including a separate machine zone adjacent each of the machines within the space;
identifying the location of the WID within the facility;
determining if the WID location is within a machine zone;
where the WID is located within a machine zone associated with a specific machine, identifying machine information related to the specific machine;
transmitting at least a sub-set of the machine information to the WID;
presenting the received information via the WID;
monitoring WID location and, when the WID is located outside the machine zone, altering the information presented via the WID.

51. The method of claim 50 wherein the received information includes a control interface specification for the specific machine and wherein the step of presenting includes configuring the WID to receive control commands for the specific machine.

52. The method of claim 51 wherein the step of altering the information includes transmitting access information to the WID where the access information includes operating characteristics for the specific machine and presenting at least a sub-set of the access information via the WID.

53. The method of claim 52 wherein the step of presenting the access information includes presenting the access information until the WID is again located within a machine zone.

54. The method of claim 50 wherein the step of altering includes halting provision of the information.

55. The method of claim 50 wherein, for at least a sub-set of the machines within the space, the step of identifying machine zones includes identifying first and second machine zones where the first machine zone is smaller than the second machine zone and where first and second different sub-sets of machine information correspond to the first and second machine zones, respectively, the method further including the step of, where the WID is within one of the first and second zones corresponding to a specific machine, identifying which of the first and second zones the WID is in and, wherein the step of identifying machine information related to the specific machine includes the step of identifying the information sub-set corresponding to the identified zone.

56. The method of claim 55 wherein the second information sub-set includes access information and the first information sub-set includes control information for the specific machine and wherein the step of presenting includes configuring the WID as a function of the control information to receive control commands for the specific machine when the first information sub-set is transmitted.

* * * * *